United States Patent
Vaze et al.

(10) Patent No.: US 10,985,964 B2
(45) Date of Patent: Apr. 20, 2021

(54) TECHNIQUES FOR SELECTING SUBCARRIER SPACING FOR SIGNAL DETECTION

(71) Applicant: QUALCOMM Incorporated, San Diego, CA (US)

(72) Inventors: Chinmay Shankar Vaze, San Diego, CA (US); Hung Dinh Ly, San Diego, CA (US); Alexei Yurievitch Gorokhov, San Diego, CA (US); Nathan Yee, Saratoga, CA (US); Hari Sankar, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/126,832

(22) Filed: Sep. 10, 2018

(65) Prior Publication Data

US 2019/0081843 A1     Mar. 14, 2019

Related U.S. Application Data

(60) Provisional application No. 62/556,967, filed on Sep. 11, 2017.

(51) Int. Cl.
| | |
|---|---|
| *H04L 27/26* | (2006.01) |
| *H04L 5/00* | (2006.01) |
| *H04J 11/00* | (2006.01) |
| *H04W 72/04* | (2009.01) |

(52) U.S. Cl.
CPC ........ *H04L 27/2666* (2013.01); *H04J 11/005* (2013.01); *H04J 11/0093* (2013.01);
(Continued)

(58) Field of Classification Search
CPC ... H04J 11/005; H04J 11/0093; H04L 5/0001; H04L 5/0007; H04L 5/001; H04L 5/0048;
(Continued)

(56) References Cited

U.S. PATENT DOCUMENTS

| 9,629,050 B2 * | 4/2017 | Siomina ................ H04W 36/18 |
| 2006/0142032 A1 * | 6/2006 | Derakhshan .......... H04W 36/30 |
| | | 455/509 |

(Continued)

OTHER PUBLICATIONS

Huawei Hisilicon: "RRM Consideration on Initial Access in NR", 3GPP Draft, R4-1610048, RRM Consideration on Initial Access in NR, 3rd Generation Partnership Project (3GPP), Mobile Competence Centre, 650, Route Des Lucioles, F-06921 Sophia-Antipolis Cedex, France, vol. RAN WG4, No. Reno, USA, Nov. 14, 2016-Nov. 18, 2016, Nov. 14, 2016 (Nov. 14, 2016), XP051180226, pp. 1-5, Retrieved from the Internet: URL:http://www.3gpp.org/ftp/Meetings_3GPP_SYNC/RAN4/Docs/ [retrieved on Nov. 14, 2016] sections 1-3.

(Continued)

*Primary Examiner* — David B Lugo
(74) *Attorney, Agent, or Firm* — QUALCOMM Incorporated

(57) ABSTRACT

Techniques are described herein that allow a user equipment (UE) to configure a subcarrier spacing value while monitoring synchronization signals of neighboring cells. In some wireless communication systems, synchronization signals in given radio frequency spectrum band may be transmitted using one of a plurality of different subcarrier spacings. In some cases, a network entity, such as a base station, may transmit an indication to the UE that indicates the subcarrier spacing used by a cell to transmit a specific set of synchronization signals. In some cases, the UE may select a subcarrier spacing based on a database of subcarrier spacings stored locally by the UE. In some cases, the UE may select the subcarrier spacing based on a predetermined configuration.

51 Claims, 16 Drawing Sheets

(52) U.S. Cl.
CPC ............ *H04L 5/001* (2013.01); *H04L 5/0007* (2013.01); *H04L 5/0053* (2013.01); *H04L 5/0092* (2013.01); *H04L 27/2613* (2013.01); *H04L 27/2692* (2013.01); *H04W 72/0453* (2013.01); *H04L 5/0001* (2013.01); *H04L 5/0048* (2013.01)

(58) Field of Classification Search
CPC . H04L 5/0053; H04L 5/0092; H04L 27/2613; H04L 27/2666; H04L 27/2692; H04W 72/0453

See application file for complete search history.

(56) References Cited

U.S. PATENT DOCUMENTS

| | | | | |
|---|---|---|---|---|
| 2011/0110254 | A1* | 5/2011 | Ji | H04W 36/0066 370/252 |
| 2017/0311276 | A1* | 10/2017 | Tsai | H04B 7/0617 |
| 2018/0279312 | A1* | 9/2018 | Dalsgaard | H04B 1/713 |
| 2019/0149384 | A1* | 5/2019 | Kim | H04L 27/2613 |
| 2019/0253223 | A1* | 8/2019 | Gong | H04J 4/00 |

OTHER PUBLICATIONS

Intel Corporation: "On UE Measurement Capability for NR", 3GPP Draft, R4-1704697, On UE Measurement Capability for NR, 3rd Generation Partnership Project (3GPP). Mobile Competence Centre, 650, Route Des Lucioles, F-86921 Sophia-Antipolis Cedex, France, vol. RAN WG4. No. Hangzhou. China, May 15, 2017-May 19, 2017, May 14, 2017 (May 14, 2017), XP051276917, pp. 1-5, Retrieved from the Internet: URL:http://www.3gpp.org/ftp/Meetings_3GPP_SYNC/RAN4/Docs/ [retrieved on May 14, 2017] sections 1-6.

International Search Report and Written Opinion—PCT/US2018/050394—ISA/EPO—dated Nov. 30, 2018.

LG Electronics: "Discussion on SS Frequency Raster", 3GPP Draft, R1-1704863, LG Discussion on SS Frequency Raster, 3rd Generation Partnership Project (3GPP), Mobile Competence Centre, 650, Route Des Lucioles, F-06921 Sophia-Antipolis Cedex, France, vol. RAN WG1, No. Spokane, USA, Apr. 3, 2017-Apr. 7, 2017, Apr. 2, 2017 (Apr. 2, 2017), 4 pages, XP051242998, Retrieved from the Internet: URL:http://www.3gpp.org/ftp/Meetings_3GPP_SYNC/RAN1/Docs/ [retrieved on Apr. 2, 2017] sections 1-3.

ZTE: "Discussion on Intra Frequency and Inter Frequency Definition in NR", 3GPP Draft, R4-1708192 Discussion on Intra Frequency and Inter Frequency Definition in NR, 3rd Generation Partnership Project (3GPP), Mobile Competence Centre, 650, Route Des Lucioles, F-86921 Sophi, vol. RAN WG4. No. Berlin. Germany, Aug. 21, 2017-Aug. 25, 2017, Aug. 28, 2017 (Aug. 28, 2017), XP051321336, 9 pages, Retrieved from the Internet: URL:http://www.3gpp.org/ftp/Meetings_3GPP_SYNC/RAN4/Docs/ [retrieved on Aug. 20, 2017] sections 1-3.

\* cited by examiner

TECHNIQUES FOR SELECTING SUBCARRIER SPACING FOR SIGNAL DETECTION

CROSS REFERENCE

The present Application for Patent claims the benefit of U.S. Provisional Patent Application No. 62/556,967 by VAZE, et al., entitled "TECHNIQUES FOR SELECTING SUBCARRIER SPACING FOR SIGNAL DETECTION," filed Sep. 11, 2017, assigned to the assignee hereof, and expressly incorporated herein.

BACKGROUND

The following relates generally to wireless communication, and more specifically to techniques for selecting subcarrier spacing for signal detection.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communication systems may support a plurality of possible subcarrier spacings for messages communicated using a given frequency band. For example synchronization signals in a given frequency band may be transmitted using one of a plurality of possible subcarrier spacings.

SUMMARY

The described techniques relate to improved methods, systems, devices, or apparatuses that support techniques for selecting subcarrier spacing for signal detection. Generally, the described techniques provide for a user equipment (UE) to configure a subcarrier spacing value while monitoring synchronization signals of neighboring cells. In some wireless communication systems, synchronization signals in given radio frequency spectrum band may be transmitted using one of a plurality of different subcarrier spacings. In some cases, a network entity, such as a base station, may transmit an indication to the UE that indicates the subcarrier spacing used by a cell to transmit a specific set of synchronization signals. In some cases, the UE may select a subcarrier spacing based on a database of subcarrier spacings stored locally by the UE. In some cases, the UE may select the subcarrier spacing based on a predetermined configuration.

A method of wireless communication is described. The method may include initiating an intra-frequency and inter-frequency search and measurement procedure for a UE connected to the base station, identifying a subcarrier spacing of a synchronization signal transmitted by a neighboring cell based at least in part on initiating the intra-frequency and inter-frequency search and measurement procedure, and transmitting an indication of the subcarrier spacing of the synchronization signal to the UE.

An apparatus for wireless communication is described. The apparatus may include means for initiating an intra-frequency and inter-frequency search and measurement procedure for a UE connected to the base station, means for identifying a subcarrier spacing of a synchronization signal transmitted by a neighboring cell based at least in part on initiating the intra-frequency and inter-frequency search and measurement procedure, and means for transmitting an indication of the subcarrier spacing of the synchronization signal to the UE.

Another apparatus for wireless communication is described. The apparatus may include a processor, memory in electronic communication with the processor, and instructions stored in the memory. The instructions may be operable to cause the processor to initiate an intra-frequency and inter-frequency search and measurement procedure for a UE connected to the base station, identify a subcarrier spacing of a synchronization signal transmitted by a neighboring cell based at least in part on initiating the intra-frequency and inter-frequency search and measurement procedure, and transmit an indication of the subcarrier spacing of the synchronization signal to the UE.

A non-transitory computer readable medium for wireless communication is described. The non-transitory computer-readable medium may include instructions operable to cause a processor to initiate an intra-frequency and inter-frequency search and measurement procedure for a UE connected to the base station, identify a subcarrier spacing of a synchronization signal transmitted by a neighboring cell based at least in part on initiating the intra-frequency and inter-frequency search and measurement procedure, and transmit an indication of the subcarrier spacing of the synchronization signal to the UE.

Some examples of the method, apparatus, and non-transitory computer-readable medium described herein may further include processes, features, means, or instructions for identifying one or more radio frequency spectrum band resources to be monitored by the UE during the intra-frequency and inter-frequency search and measurement procedure, where identifying the subcarrier spacing may be based at least in part on identifying the one or more radio frequency spectrum band resources.

Some examples of the method, apparatus, and non-transitory computer-readable medium described herein may further include processes, features, means, or instructions for identifying the neighboring cell to be monitored by the UE during the intra-frequency and inter-frequency search and measurement procedure, where identifying the subcarrier spacing may be based at least in part on identifying the neighboring cell.

In some examples of the method, apparatus, and non-transitory computer-readable medium described herein, the identified subcarrier spacing may be selected from a set of two possible subcarrier spacings for a given set of radio frequency spectrum band resources.

Some examples of the method, apparatus, and non-transitory computer-readable medium described herein may further include processes, features, means, or instructions for inning sub-six radio frequency spectrum bands the subcarrier spacing for the synchronization signal may be 15 kilohertz or 30 kilohertz.

Some examples of the method, apparatus, and non-transitory computer-readable medium described herein may further include processes, features, means, or instructions for inning millimeter wave (mmW) radio frequency spectrum bands the subcarrier spacing for the synchronization signal may be 120 kilohertz or 240 kilohertz.

Some examples of the method, apparatus, and non-transitory computer-readable medium described herein may further include processes, features, means, or instructions for identifying a plurality of subcarrier spacings of synchronization signals transmitted by a plurality of cells that neighbor the base station. Some examples of the method, apparatus, and non-transitory computer-readable medium described herein may further include processes, features, means, or instructions for storing the plurality of subcarrier spacings, where identifying the subcarrier spacing of the neighboring cell may be based at least in part on storing the plurality of subcarrier spacings.

Some examples of the method, apparatus, and non-transitory computer-readable medium described herein may further include processes, features, means, or instructions for receiving a measurement report from the UE based at least in part on transmitting the indication.

In some examples of the method, apparatus, and non-transitory computer-readable medium described herein, the indication may be part of a measurement configuration message transmitted by the base station to the UE.

In some examples of the method, apparatus, and non-transitory computer-readable medium described herein, the indication may be a one-bit field.

In some examples of the method, apparatus, and non-transitory computer-readable medium described herein, the indication may be part of a radio resource control (RRC) message.

A method of wireless communication is described. The method may include identifying one or more radio frequency spectrum band resources to be monitored by the UE during an intra-frequency and inter-frequency search and measurement procedure, identifying a plurality of subcarrier spacings of a synchronization signal transmitted by a neighboring cell associated with the one or more radio frequency spectrum band resources, and monitoring the synchronization signal of the neighboring cell using each of the plurality of subcarrier spacings.

An apparatus for wireless communication is described. The apparatus may include means for identifying one or more radio frequency spectrum band resources to be monitored by the UE during an intra-frequency and inter-frequency search and measurement procedure, means for identifying a plurality of subcarrier spacings of a synchronization signal transmitted by a neighboring cell associated with the one or more radio frequency spectrum band resources, and means for monitoring the synchronization signal of the neighboring cell using each of the plurality of subcarrier spacings.

Another apparatus for wireless communication is described. The apparatus may include a processor, memory in electronic communication with the processor, and instructions stored in the memory. The instructions may be operable to cause the processor to identify one or more radio frequency spectrum band resources to be monitored by the UE during an intra-frequency and inter-frequency search and measurement procedure, identify a plurality of subcarrier spacings of a synchronization signal transmitted by a neighboring cell associated with the one or more radio frequency spectrum band resources, and monitor the synchronization signal of the neighboring cell using each of the plurality of subcarrier spacings.

A non-transitory computer readable medium for wireless communication is described. The non-transitory computer-readable medium may include instructions operable to cause a processor to identify one or more radio frequency spectrum band resources to be monitored by the UE during an intra-frequency and inter-frequency search and measurement procedure, identify a plurality of subcarrier spacings of a synchronization signal transmitted by a neighboring cell associated with the one or more radio frequency spectrum band resources, and monitor the synchronization signal of the neighboring cell using each of the plurality of subcarrier spacings.

Some examples of the method, apparatus, and non-transitory computer-readable medium described herein may further include processes, features, means, or instructions for determining a search order for the plurality of subcarrier spacings, where monitoring the synchronization signal includes monitoring the synchronization signal using a first subcarrier spacing in the search order and monitoring the synchronization signal using a second subcarrier spacing in the search order after using the first subcarrier spacing.

Some examples of the method, apparatus, and non-transitory computer-readable medium described herein may further include processes, features, means, or instructions for receiving an indication from a base station indicating a subcarrier spacing associated with a specific synchronization signal, where determining the search order may be based at least in part on receiving the indication.

Some examples of the method, apparatus, and non-transitory computer-readable medium described herein may further include processes, features, means, or instructions for identifying the first subcarrier spacing from the plurality of subcarrier spacings using a database of subcarrier spacings stored by the UE, where determining the search order may be based at least in part on using the database of subcarrier spacings stored by the UE.

Some examples of the method, apparatus, and non-transitory computer-readable medium described herein may further include processes, features, means, or instructions for identifying the first subcarrier spacing from the plurality of subcarrier spacings based on a preconfigured order, where determining the search order may be based at least in part on using the preconfigured order.

Some examples of the method, apparatus, and non-transitory computer-readable medium described herein may further include processes, features, means, or instructions for transmitting a measurement report to a base station based at least in part on monitoring the synchronization signal using each of the plurality of subcarrier spacings.

Some examples of the method, apparatus, and non-transitory computer-readable medium described herein may further include processes, features, means, or instructions for identifying a subcarrier spacing of a specific synchronization signal transmitted by a cell connected to the UE. Some examples of the method, apparatus, and non-transitory computer-readable medium described herein may further include processes, features, means, or instructions for storing the subcarrier spacing of the cell, where identifying the plurality of subcarrier spacings of the neighboring cell may be based at least in part on storing the subcarrier spacing.

In some examples of the method, apparatus, and non-transitory computer-readable medium described herein, the plurality of subcarrier spacings includes a set of two possible subcarrier spacings for a given set of radio frequency spectrum band resources.

Some examples of the method, apparatus, and non-transitory computer-readable medium described herein may further include processes, features, means, or instructions for inning sub-six radio frequency spectrum bands the plurality of subcarrier spacings for the synchronization signal may be 15 kilohertz or 30 kilohertz.

Some examples of the method, apparatus, and non-transitory computer-readable medium described herein may further include processes, features, means, or instructions for inning mmW radio frequency spectrum bands the plurality of subcarrier spacings for the synchronization signal may be 120 kilohertz or 240 kilohertz.

Some examples of the method, apparatus, and non-transitory computer-readable medium described herein may further include processes, features, means, or instructions for monitoring each of the plurality of subcarrier spacings may be based at least in part on failing to receive an indication from a base station about a subcarrier spacing associated with a specific synchronization signal.

A method of wireless communication is described. The method may include initiating an intra-frequency and inter-frequency search and measurement procedure, identifying a subcarrier spacing of a synchronization signal transmitted by a neighboring cell from a plurality of possible subcarrier spacings of the synchronization signal based at least in part on initiating the intra-frequency and inter-frequency search and measurement procedure, and monitoring the synchronization signal of the neighboring cell using the identified subcarrier spacing.

An apparatus for wireless communication is described. The apparatus may include means for initiating an intra-frequency and inter-frequency search and measurement procedure, means for identifying a subcarrier spacing of a synchronization signal transmitted by a neighboring cell from a plurality of possible subcarrier spacings of the synchronization signal based at least in part on initiating the intra-frequency and inter-frequency search and measurement procedure, and means for monitoring the synchronization signal of the neighboring cell using the identified subcarrier spacing.

Another apparatus for wireless communication is described. The apparatus may include a processor, memory in electronic communication with the processor, and instructions stored in the memory. The instructions may be operable to cause the processor to initiate an intra-frequency and inter-frequency search and measurement procedure, identify a subcarrier spacing of a synchronization signal transmitted by a neighboring cell from a plurality of possible subcarrier spacings of the synchronization signal based at least in part on initiating the intra-frequency and inter-frequency search and measurement procedure, and monitor the synchronization signal of the neighboring cell using the identified subcarrier spacing.

A non-transitory computer readable medium for wireless communication is described. The non-transitory computer-readable medium may include instructions operable to cause a processor to initiate an intra-frequency and inter-frequency search and measurement procedure, identify a subcarrier spacing of a synchronization signal transmitted by a neighboring cell from a plurality of possible subcarrier spacings of the synchronization signal based at least in part on initiating the intra-frequency and inter-frequency search and measurement procedure, and monitor the synchronization signal of the neighboring cell using the identified subcarrier spacing.

Some examples of the method, apparatus, and non-transitory computer-readable medium described herein may further include processes, features, means, or instructions for receiving an indication of the subcarrier spacing of the synchronization signal from a base station, where identifying the subcarrier spacing may be based at least in part on receiving the indication.

Some examples of the method, apparatus, and non-transitory computer-readable medium described herein may further include processes, features, means, or instructions for identifying one or more radio frequency spectrum band resources to be monitored during the intra-frequency and inter-frequency search and measurement procedure, where identifying the subcarrier spacing may be based at least in part on identifying the one or more radio frequency spectrum band resources.

Some examples of the method, apparatus, and non-transitory computer-readable medium described herein may further include processes, features, means, or instructions for identifying the neighboring cell to be monitored during the intra-frequency and inter-frequency search and measurement procedure, where identifying the subcarrier spacing may be based at least in part on identifying the neighboring cell.

Some examples of the method, apparatus, and non-transitory computer-readable medium described herein may further include processes, features, means, or instructions for searching a database of subcarrier spacings stored on the UE, where identifying the subcarrier spacing may be based at least in part on identifying the neighboring cell.

DETAILED DESCRIPTION

In some wireless communication systems, synchronization signals may be transmitted using one of a plurality of subcarrier spacings. The plurality of possible subcarrier spacings may be based on the transmitting cell and/or the radio frequency spectrum band resources being used to transmit the synchronization signals. For example, in sub-six frequency bands, a cell may transmit synchronization signals using a 15 kHz subcarrier spacing or a 30 kHz subcarrier spacing. In millimeter wave (mmW) frequency bands, the cell may transmit the synchronization signals using a 120 kHz subcarrier spacing or a 240 kHz subcarrier spacing. To successfully receive and decode a signal, a receiving device (e.g., UE) may need to listen for the signal using the same subcarrier spacing as was used to transmit the signal.

Techniques are described herein that allow a UE to configure a subcarrier spacing value while monitoring synchronization signals of neighboring cells. In some wireless communication systems, synchronization signals in given radio frequency spectrum band may be transmitted using one of a plurality of different subcarrier spacings. In some cases, a network entity, such as a base station, may transmit an indication to the UE that indicates the subcarrier spacing used by a cell to transmit a specific set of synchronization signals. In some cases, the UE may select a subcarrier spacing based on a database of subcarrier spacings stored locally by the UE. In some cases, the UE may select the subcarrier spacing based on a predetermined configuration.

Aspects of the disclosure are initially described in the context of a wireless communications system. Aspects of the disclosure are described in the context of communication schemes between network entities. Aspects of the disclosure are further illustrated by and described with reference to apparatus diagrams, system diagrams, and flowcharts that relate to techniques for selecting subcarrier spacing for signal detection.

Figure 1:
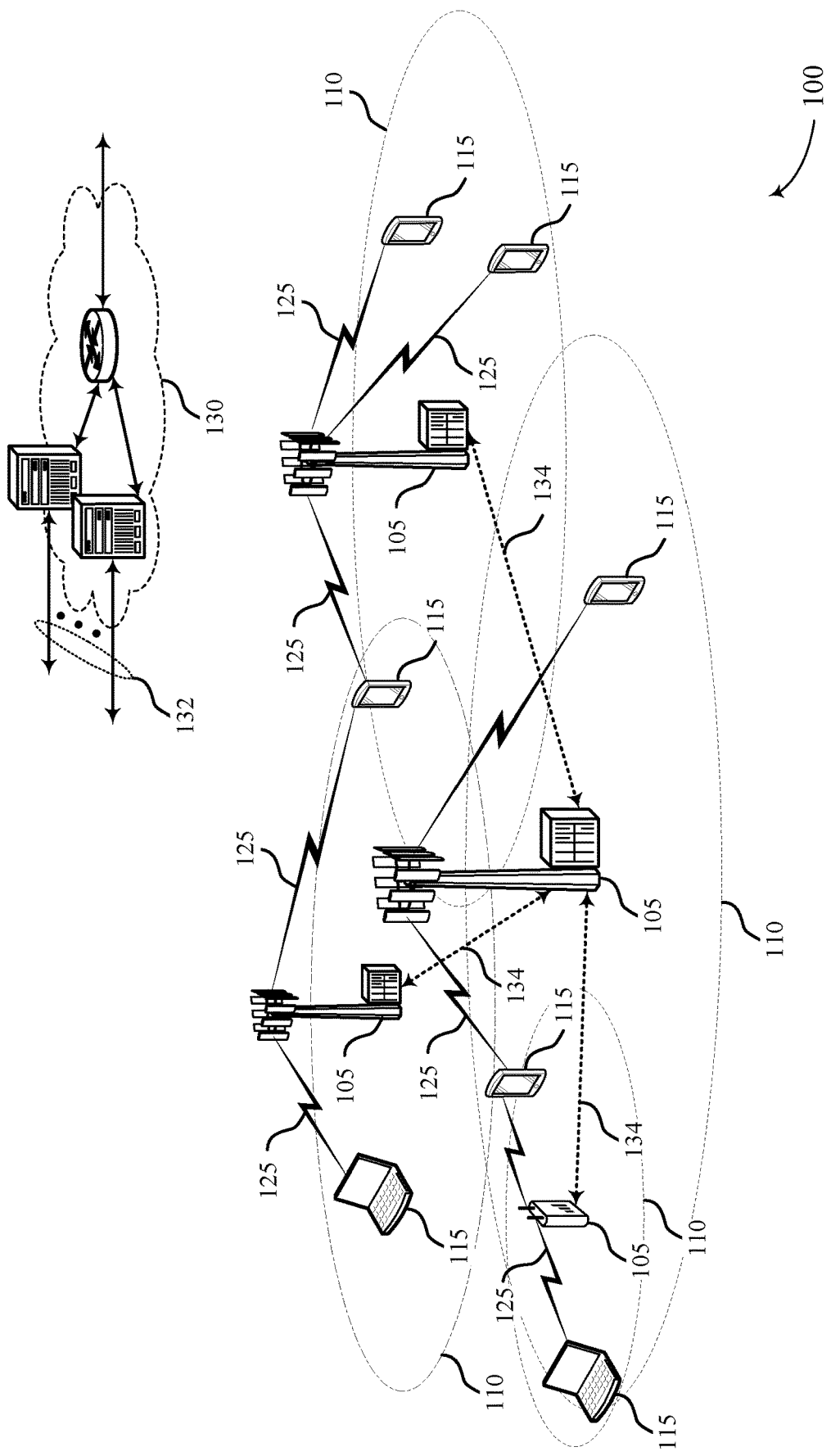
FIG. 1 illustrates an example of a system for wireless communication that supports techniques for selecting subcarrier spacing for signal detection in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si interface or another interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels.

The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

To successfully receive and decode a signal, a receiving device (e.g., a UE) may need to use the same subcarrier spacing that was used to transmit the signal. In some wireless communication signals, a transmitting device (e.g., a base station) may be capable of transmitting a signal using a plurality of different subcarrier spacings. As such, the receiving device may need to configure a subcarrier spacing parameter to successfully decode signals. Techniques are described herein for configuring the subcarrier spacing parameter in a receiving device. For example, the subcarrier spacing parameter may be configured based on a message received from a network entity, a database of subcarrier spacings stored locally on the receiving device, or a predetermined configuration. In some cases, subcarrier spacings or the subcarrier spacing parameter may be referred to as a numerology.

Figure 2:
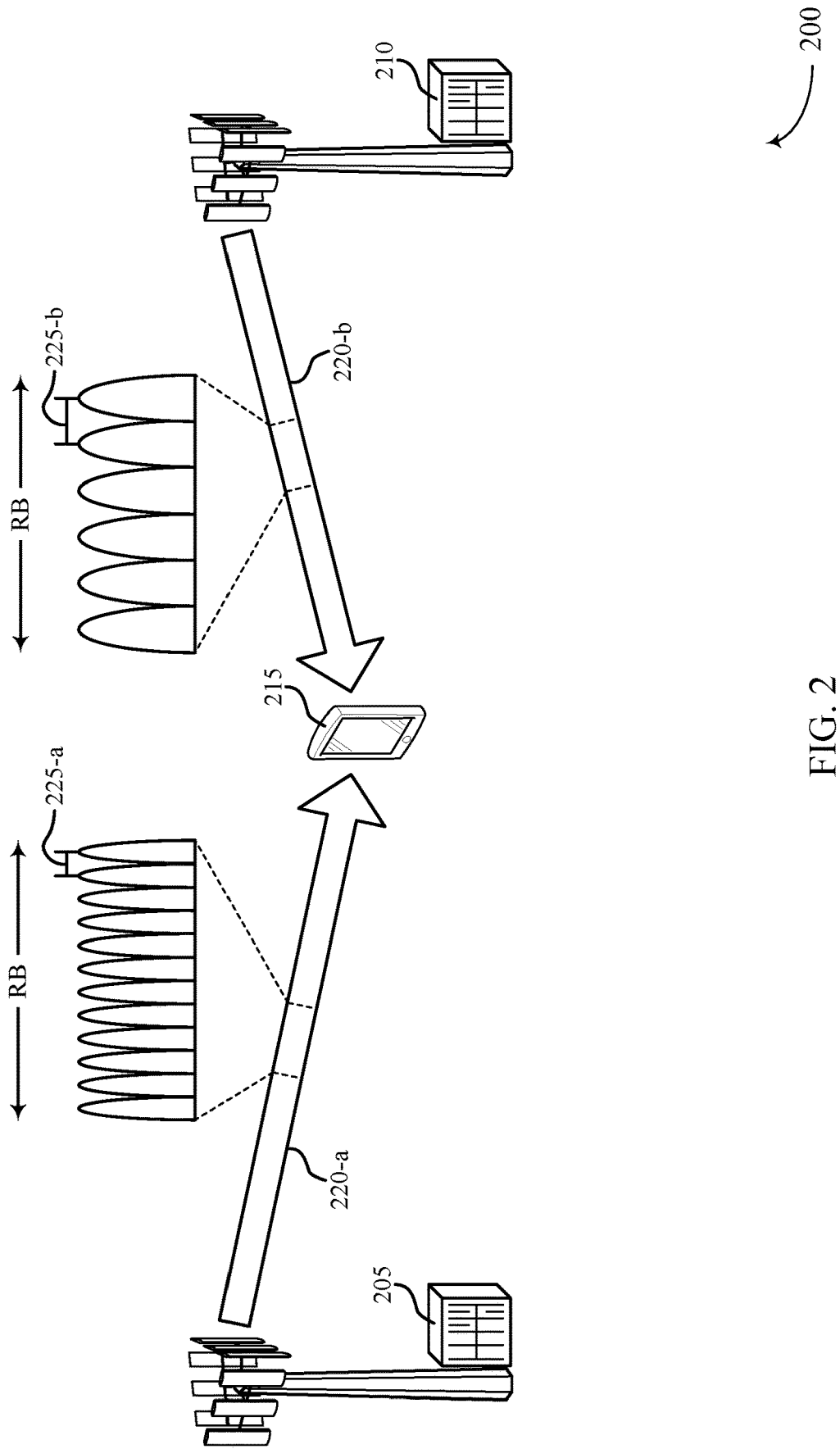
FIG. 2 illustrates an example of a wireless communication system that supports techniques for selecting subcarrier spacing for signal detection in accordance with aspects of the present disclosure.

FIG. 2 illustrates an example of a wireless communication system 200 that supports techniques for selecting subcarrier spacing for signal detection in accordance with various aspects of the present disclosure. In some examples, the wireless communication system 200 may implement aspects of wireless communication system 100. The wireless communication system 200 includes communications between a first base station 205, a second base station 210, and a UE 215. The first base station 205 and the second base station 210 may be examples of the base station 105 described with reference to FIG. 1. The UE 215 may be an example of the UEs 115 described with reference to FIG. 1.

In the wireless communication system 200, synchronization signals 220 may be transmitted using a plurality of subcarrier spacings 225. The plurality of possible subcarrier spacings may be based on the radio frequency spectrum band resources being used to transmit the synchronization signals 220. For example, in sub-six frequency bands, the synchronization signals 220 may be transmitted using a 15 kilohertz (kHz) subcarrier spacing or a 30 kHz subcarrier spacing. In mmW frequency bands, the synchronization signals 220 may be transmitted using a 120 kHz subcarrier spacing or a 240 kHz subcarrier spacing.

In some cases, neighboring cells or neighboring base stations (e.g., the first base station 205 and the second base station 210) may use different subcarrier spacings 225 to transmit synchronization signals 220. As a result, over a given frequency band, a UE may receive synchronization signals 220 with different subcarrier spacings 225. For example, for a given frequency band, a first base station 205 may transmit a first set of synchronization signals 220-a using a first subcarrier spacing 225-a (e.g., 15 kHz or 120 kHz) and the second base station 210 may transmit a second set of synchronization signals 220-b using a second subcarrier spacing 225-b different from the first subcarrier spacing 225-a (e.g., 30 kHz or 240 kHz). In some cases, the synchronization signals 220 may be associated with different cells irrespective of which base station transmitted the synchronization signal 220. For example, the same base station (e.g., first base station 205) may transmit synchronization signals 220-a using the first subcarrier spacing 225-a in a first cell and transmit synchronization signals 220-b using the second subcarrier spacing 225-b in a second cell.

When monitoring for synchronization signals 220, the UE 215 may need to know which subcarrier spacing 225 is being used to transmit the synchronization signals 220 to successfully receive and/or decode the synchronization signal 220. For example, when the UE 215 performs an intra-frequency and inter-frequency search and measurement procedure, the UE 215 may monitor the synchronization signals 220 of neighboring cells to measure various signal parameters and determine whether a handover event should be initiated. In such neighbor search procedures, the UE 215 may monitor for synchronization signals using specific subcarrier spacings 225.

Techniques are described herein that allow a UE 215 to configure a subcarrier spacing 225 value while monitoring for synchronization signals 220. In some wireless communication systems, synchronization signals 220 in given radio frequency spectrum band may be transmitted using one of a plurality of different subcarrier spacing values. In some cases, the UE 215 may receive an indication of the subcarrier spacing of the synchronization signals from a network entity (e.g., a base station 205). In some cases, the UE 215 may select a subcarrier spacing based on a database of subcarrier spacings stored locally by the UE 215. In some cases, the UE 215 may select the subcarrier spacing based on a predetermined configuration.

Figure 3:
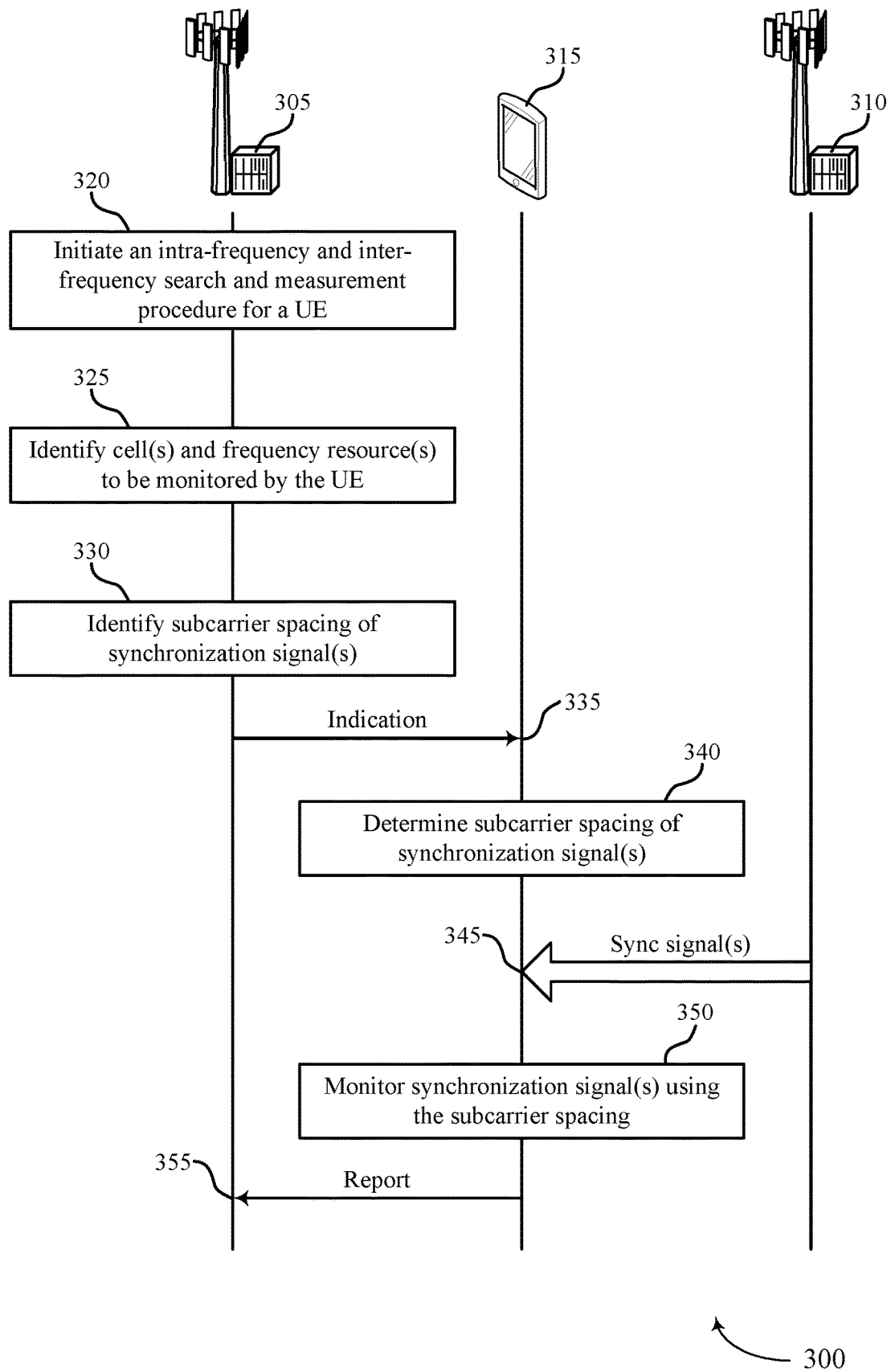
FIG. 3 illustrates an example of a communication scheme that supports techniques for selecting subcarrier spacing for signal detection in accordance with aspects of the present disclosure.

FIG. 3 illustrates an example of a communication scheme 300 that supports techniques for selecting subcarrier spacing for signal detection in accordance with various aspects of the present disclosure. In some examples, the communication scheme 300 may implement aspects of wireless communication systems 100 and 200.

The communication scheme 300 may illustrate a procedure where a network entity (e.g., connected base station 305) indicates the subcarrier spacing of synchronization signals transmitted by a neighboring cell (e.g., transmitted by neighboring base station 310) to the UE 315. The communication scheme 300 includes functions performed by and communications exchanged between various combinations of the connected base station 305, the neighboring base station 310, and the UE 315. The connected base station 305 may be an example of base stations 105, 205 described with reference to FIGS. 1-2. The neighboring base station 310 may be an example of base stations 105, 210 described with reference to FIGS. 1-2. The UE 315 may be an example of UEs 115, 215 described with reference to FIGS. 1-2. In some cases, the connected base station 305 may refer to the primary cell connected with the UE 315 and the neighboring base station 310 may refer to a non-connected cell that is within the vicinity of the UE 315.

At block 320, the connected base station 305 may initiate an intra-frequency and inter-frequency search and measurement procedure for the UE 315 that is connected with the connected base station 305. The intra-frequency and inter-frequency search and measurement procedure may be configured to evaluate cell selection criterion. The intra-frequency and inter-frequency search and measurement procedure may be used to determine link conditions for neighboring cells, whether the neighboring cells be intra-RAT, inter-RAT, intra-frequency bands, or inter-frequency bands. In some cases, the intra-frequency and inter-frequency search and measurement procedure may be referred to as a neighbor cell selection procedure. The UE 315 or the base station 305 may use the information determined during the intra-frequency and inter-frequency search and measurement procedure to determine whether a handover procedure (e.g., inter-RAT or intra-RAT) should be performed. The intra-frequency and inter-frequency search and measurement procedure may be part of a cell reselection evaluation process.

After a communication link has been established, the connected base station 305 may request that the UE 315 perform various signal measurements to determine whether the UE should be handed-over to another cell. As the UE 315 moves through the network, the UE 315 may be handed-off to other cells (e.g., a neighboring cell supported by the neighboring base station 310). In some cases, the connected base station 305 may include determining that one or more measurements are needed from the UE 315 to make determinations about handover events.

At block 325, the connected base station 305 may identify one or more neighboring cells (or neighboring base stations) that are to be monitored by the UE 315. The connected base station 305 also may identify one or more frequency bands of the neighboring cells that are to be monitored by the UE 315. The connected base station 305 may make these identifications based on knowledge about surrounding cells and/or knowledge above available bandwidth in neighboring cells. Such information may be communicated between base stations and/or cells.

At block 330, the connected base station 305 may identify a subcarrier spacing used to transmit synchronization signals transmitted by the neighboring cell (e.g., the neighboring base station 310) based on the identified neighboring cells and the identified frequency bands to be monitored. Different cells may use different subcarrier spacings to transmit synchronization signals. In some cases, the same cell use different subcarrier spacings to transmit synchronization signals in different frequency bands. In some cases, the connected base station 305 may determine whether the identified frequency bands are in a sub-six frequency band or in a mmW frequency band. Based on this determination, the connected base station 305 may identify a set of possible subcarrier spacings for any given frequency band. For example, for sub-six frequency bands the possible subcarrier spacings may be 15 kHz and 30 kHz, and for mmW frequency bands the possible subcarrier spacings may be 120 kHz and 240 kHz.

The connected base station 305 may generate and transmit an indication 335 to the UE 315 indicating the subcarrier spacings of the cells and frequency bands to be monitored by the UE 315. In some cases, the indication 335 may be included a measurement configuration message transmitted by the connected base station 305. In some cases, the indication 335 may be single bit indicator associated with a cell identifier and/or a frequency band identifier. In such cases, a first logic value of the indication 335 may indicate that a first subcarrier spacing (e.g., 15 kHz or 120 kHz) is used and a second logic value of the indication 335 may indicate that a second subcarrier spacing (e.g., 30 kHz or 240 kHz) is used to transmit synchronization signals. The UE 315 may be configured to determine which subcarrier spacing is used based on both frequency bands indicated in the message that includes the indication 335 and the indicator itself. In some cases, the indication 335 is a multi-bit indicator that discriminates between all four possible subcarrier spacings (e.g., 15 kHz, 30 kHz, 120 kHz, and 240 kHz). In some cases, the indication 335 may be a part of a radio resource control (RRC) message. In some cases, the indication 335 may be part of a radio link control (RLC) message.

At block 340, the UE 315 may determine the subcarrier spacing of the synchronization signals based on receiving the indication 335. In some cases, the UE 315 may determine the subcarrier spacing of the synchronization signals based on information in the indication 335. The UE 315 may determine the subcarrier spacing based on the indication 335 alone (e.g., a multi-bit indication). In some cases, the UE 315 may identify a frequency band indicated in a message that includes the indication 335 and the UE 315 may identify a logic value of the indication 335. Based on the frequency band value and the value of the indication 335, the UE 315 may determine the subcarrier spacing. The UE 315 may also determine a cell identifier for one or more neighboring cells that are to be monitored and apply the subcarrier spacings to the proper neighboring cells.

The neighboring cell (e.g., the neighboring base station 310, but in some cases, it may be the connected base station 305) may transmit one or more synchronization signals 345. The synchronization signals 345 may be transmitted periodically as part of normal operation, including operations that facilitate establishing communication links with other network entities or for facilitating measurements by the UEs for handover event determinations. In some cases, the synchronization signals 345 may be directional beams. In some cases, the synchronization signals 345 may be transmitted in blocks. A block may include transmitting at least one synchronization signal 345 in every beam direction defined by a set of beam directions. In some cases, the block of synchronization signals 345 may be transmitted according to a beam transmission pattern.

At block 350, the UE 315 monitor the synchronization signals 345 using the subcarrier spacing indicated in the indication 335. The UE 315 may measure one or more parameters of the received synchronization signals 345. For example, the UE 315 may measure a received signal strength indicator (RSSI), a reference signal received power (RSRP), a reference signal received quality (RSRQ), a signal-to-interference plus noise ratio (SINR), or a combination thereof of the synchronization signals 345. In some cases, the UE 315 may identify which received synchronization signals 345 has the highest signal quality from the set of received synchronization signals 345. In some cases, the UE 315 may identify a beam index of one or more synchronization signal beams based on the measured parameters. In some cases, the UE 315 may measure beam parameters of the one or more synchronization signal beams using a single reception beam.

The UE 315 may repeat these monitoring processes for as many neighboring cells and frequency bands are to be monitored and for as many different subcarrier spacing options are available. In some cases, a wireless communication system may include any number of subcarrier spacing options for transmitting synchronization signals (e.g., 1, 2, 3, 4, 5, 6, 7, 8, 9, 10, etc.).

The UE 315 may generate and transmit a report 355 to the connected base station 305 indicating various characteristics of the received synchronization signals 345. The report 355 may include the parameters measured by the UE 315. The report 355 may include a measured parameters for a plurality of received synchronization signals 345. In some cases, report 355 may also indicate a measured subcarrier spacing for some or all of the synchronization signals 345 included in the report. The connected base station 305 may use that information to update any databases regarding the subcarrier spacings of neighboring cells.

In some circumstances, the subcarrier spacing included in the indication 335 may be incorrect or outdated. For example, the neighboring cell (e.g., the neighboring base station 310) may be transmitting synchronization signals 345 using a first subcarrier spacing (e.g., 15 kHz), but the indication 335 may indicate that the neighboring cell is transmitting synchronization signals 345 using a second subcarrier spacing (e.g., 30 kHz). If the UE 315 determines that it cannot detect or receive the synchronization signals 345 as it expects to, the UE 315 select a different subcarrier spacing for a set of possible subcarrier spacings and monitor the synchronization signals using that different subcarrier spacing. If the different subcarrier spacing is indeed correct and the UE 315 receives the synchronization signals 345, the UE 315 may include the updated subcarrier spacing in the report 355.

Figure 4:
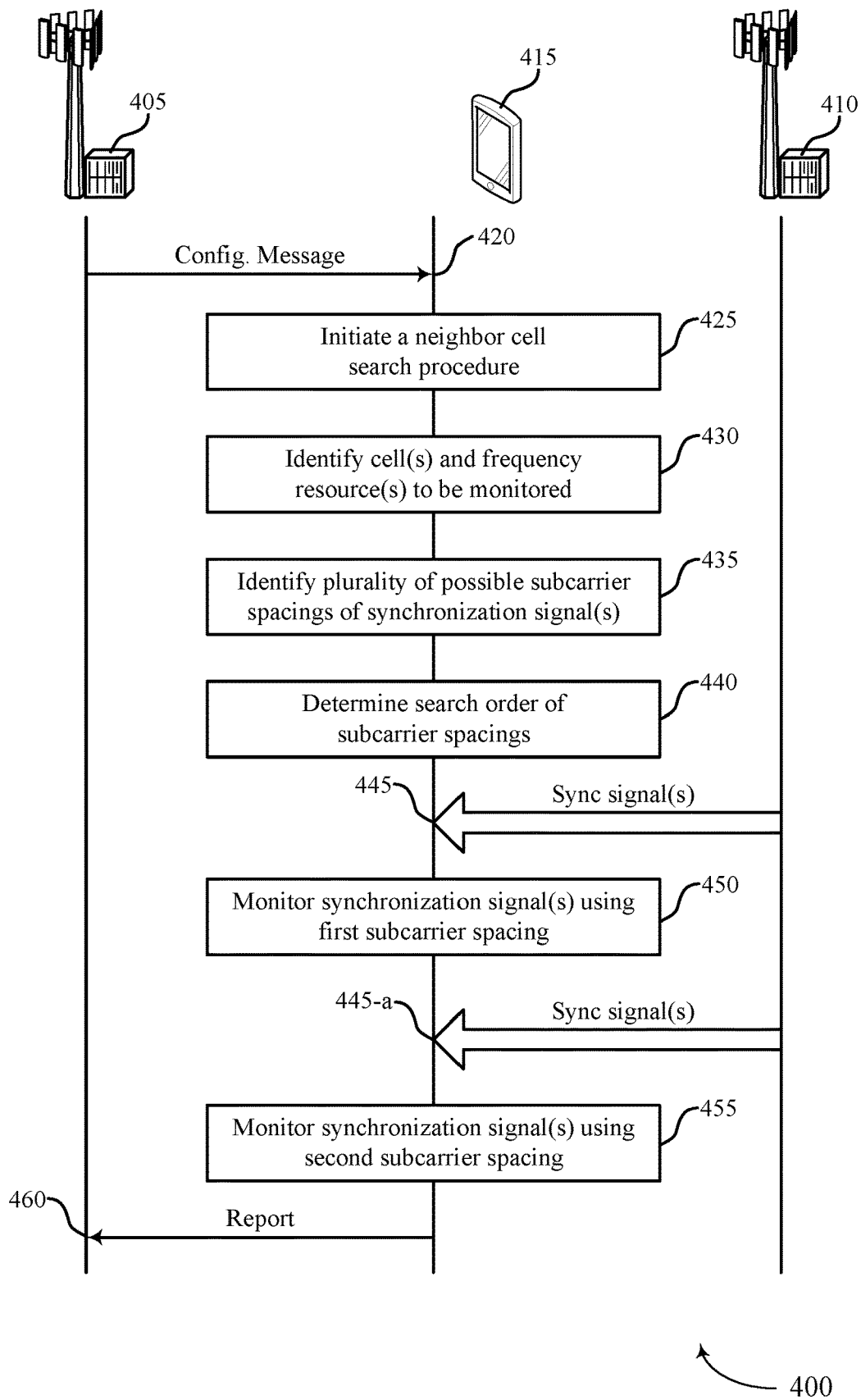
FIG. 4 illustrates an example of a communication scheme that supports techniques for selecting subcarrier spacing for signal detection in accordance with aspects of the present disclosure.

FIG. 4 illustrates an example of a communication scheme 400 that supports techniques for selecting subcarrier spacing for signal detection in accordance with various aspects of the present disclosure. In some examples, the communication scheme 400 may implement aspects of wireless communication systems 100 and 200.

The communication scheme 400 may illustrate a procedure where a UE 515 monitors a plurality of possible subcarrier spacings when monitoring synchronization signals transmitted by a neighboring cell (e.g., transmitted by neighboring base station 410). The communication scheme 400 includes functions performed by and communications exchanged between various combinations of a connected base station 405, the neighboring base station 410, and the UE 415. The connected base station 405 may be an example of base stations 105, 205, 305 described with reference to FIGS. 1-3. The neighboring base station 410 may be an example of base stations 105, 210, 310 described with reference to FIGS. 1-3. The UE may be an example of UEs 115, 215, 315 described with reference to FIGS. 1-3. In some cases, the connected base station 405 may refer to the primary cell connected with the UE 415 and the neighboring base station 410 may refer to a non-connected cell that is within the vicinity of the UE 415.

The UE 415 may receive a configuration message 420 from the connected base station 405 indicating that the UE 415 is to initiate a neighboring cell search procedure or measure one or more parameters of one or more synchronization signals of one or more neighboring cells. In some cases, the configuration message 420 may be an example of a measurement configuration message. In some cases, the configuration message 420 may be an example of RRC message. In some cases, the configuration message 420 may be an example of a radio link control (RLC) message. The configuration message 420 may not include any indication about subcarrier spacings of the synchronization signals.

At block 425, the UE 415 may initiate a neighboring cell search procedure based on receiving the configuration message 420. In some cases, the UE 415 may initiate a synchronization signal measurement procedure based on receiving the configuration message 420

At block 430, the UE 415 may identify one or more neighboring cells (or neighboring base stations) that are to be monitored by the UE 415. The UE 415 also may identify one or more frequency bands of the neighboring cells that are to be monitored. The UE 415 may make these identifications based on information included in the configuration message 420.

At block 435, the UE 415 may identify a plurality of possible subcarrier spacings used to transmit synchronization signals transmitted by the neighboring cell (e.g., the neighboring base station 410) based on configuration message 420. For example, the UE 415 may determine whether the identified frequency bands are in a sub-six frequency band or in a mmW frequency band based on the configuration message 420. Based on this determination, the UE 415 may identify a set of possible subcarrier spacings for the identified frequency band. For example, for sub-six frequency bands the possible subcarrier spacings may be 15 kHz and 30 kHz, and for mmW frequency bands the possible subcarrier spacings may be 120 kHz and 240 kHz.

At block 440, the UE 415 may determine a search order of the plurality of subcarrier spacings identified earlier. Because the network did not inform the UE 415 which subcarrier spacing is being used to transmit synchronization signals, the UE 415 may configure itself to monitor synchronization signals using all possible subcarrier spacings. The UE 415 may determine an order of the subcarrier spacings to use during the monitoring.

In some cases, the UE 415 may determine an order for subcarrier spacing monitoring based on a predetermined configuration. The UE 415 may be preconfigured to always search the subcarrier spacings in a specific order for a given frequency band. For example, in mmW frequency bands, the UE 415 may be configured to monitor first using the 120 kHz subcarrier spacing and second using the 240 kHz subcarrier spacing, or vice versa. In some situations, the UE 415 may have preconfigured search orders for more specific frequency bands than merely dividing the available spectrum into sub-six bands and mmW bands.

In some cases, the UE 415 may determine an order for subcarrier spacing monitoring based on information included in a database of the UE 415. As the UE 415 connects to different cells, the UE 415 may identify which subcarrier spacings are used in which frequency bands by the specific cell. The UE 415 may store that information for future use. When the UE 415 attempts to monitor synchronization signals transmitted by a known cell, the UE 415 may select which subcarrier spacing to monitor first based on the information included in the database. In some cases, this database is stored locally on the UE 415.

The neighboring cell (e.g., the neighboring base station 410, but in some cases, it may be the connected base station 405) may transmit a first set of synchronization signals 445. The synchronization signals 445 may be transmitted periodically as part of normal operation, including operations that facilitate establishing communication links with other network entities or for facilitating measurements by the UEs for handover event determinations. In some cases, the synchronization signals 445 may be directional beams. In some cases, the synchronization signals 445 may be transmitted in blocks. A block may include transmitting at least one synchronization signal 445 in every beam direction defined by a set of beam directions. In some cases, the block of synchronization signals 445 may be transmitted according to a beam transmission pattern.

At block 450, the UE 415 may monitor the first set of synchronization signals 445 using a first subcarrier spacing based on the search order determined previously. The UE 415 may measure one or more parameters of the received first set of synchronization signals 445. For example, the UE 415 the may measure a RSSI, RSRP, a RSRQ, a SINR, or a combination thereof of the first set of synchronization signals 445. In some cases, the UE 415 may identify which received synchronization signals 445 has the highest signal quality from the set of received synchronization signals 445. In some cases, the UE 415 may identify a beam index of one or more synchronization signal beams based on the measured parameters. In some cases, the UE 415 may measure beam parameters of the one or more synchronization signal beams using a single reception beam.

In some cases, the UE 415 may not receive or successfully decode any of the first set of synchronization signals 445 because the UE 415 is monitoring using a different subcarrier spacing than what is used to transmit the first set of synchronization signals 445. As such, the UE 415 may switch to a different subcarrier spacing to monitor a second set of synchronization signals 445-a transmitted by the neighboring cell.

At block 455, the UE 415 may monitor a second set of synchronization signals 445-a using a second subcarrier spacing (different form the first subcarrier spacing) based on the search order determined previously. The UE 415 may measure one or more parameters of the received second set of synchronization signals 445-a. For example, the UE 415 the may measure a RSSI, RSRP, a RSRQ, a SINR, or a combination thereof of the second set of synchronization signals 445-a. In some cases, the UE 415 may identify which received synchronization signals 445-a has the highest signal quality from the set of received synchronization signals 445-a. In some cases, the UE 415 may identify a beam index of one or more synchronization signal beams based on the measured parameters. In some cases, the UE 415 may measure beam parameters of the one or more synchronization signal beams using a single reception beam.

The UE 415 may repeat these monitoring processes for as many neighboring cells and frequency bands are to be monitored and for as many different subcarrier spacing options are available. In some cases, a wireless communication system may include any number of subcarrier spacing options for transmitting synchronization signals (e.g., 1, 2, 3, 4, 5, 6, 7, 8, 9, 10, etc.).

The UE 415 may generate and transmit a report 460 to the connected base station 405 indicating various characteristics of the received synchronization signals 445. The report 460 may include the parameters measured by the UE 415. The report 460 may include a measured parameters for a plurality of received synchronization signals 445. In some cases, report 460 may also indicate a measured subcarrier spacing for some or all of the synchronization signals 445 included in the report. The connected base station 405 may use that information to update any databases regarding the subcarrier spacings of neighboring cells. In some cases, the UE 415 may update its own database about subcarrier spacings of specific cells and frequency bands.

Figure 5:
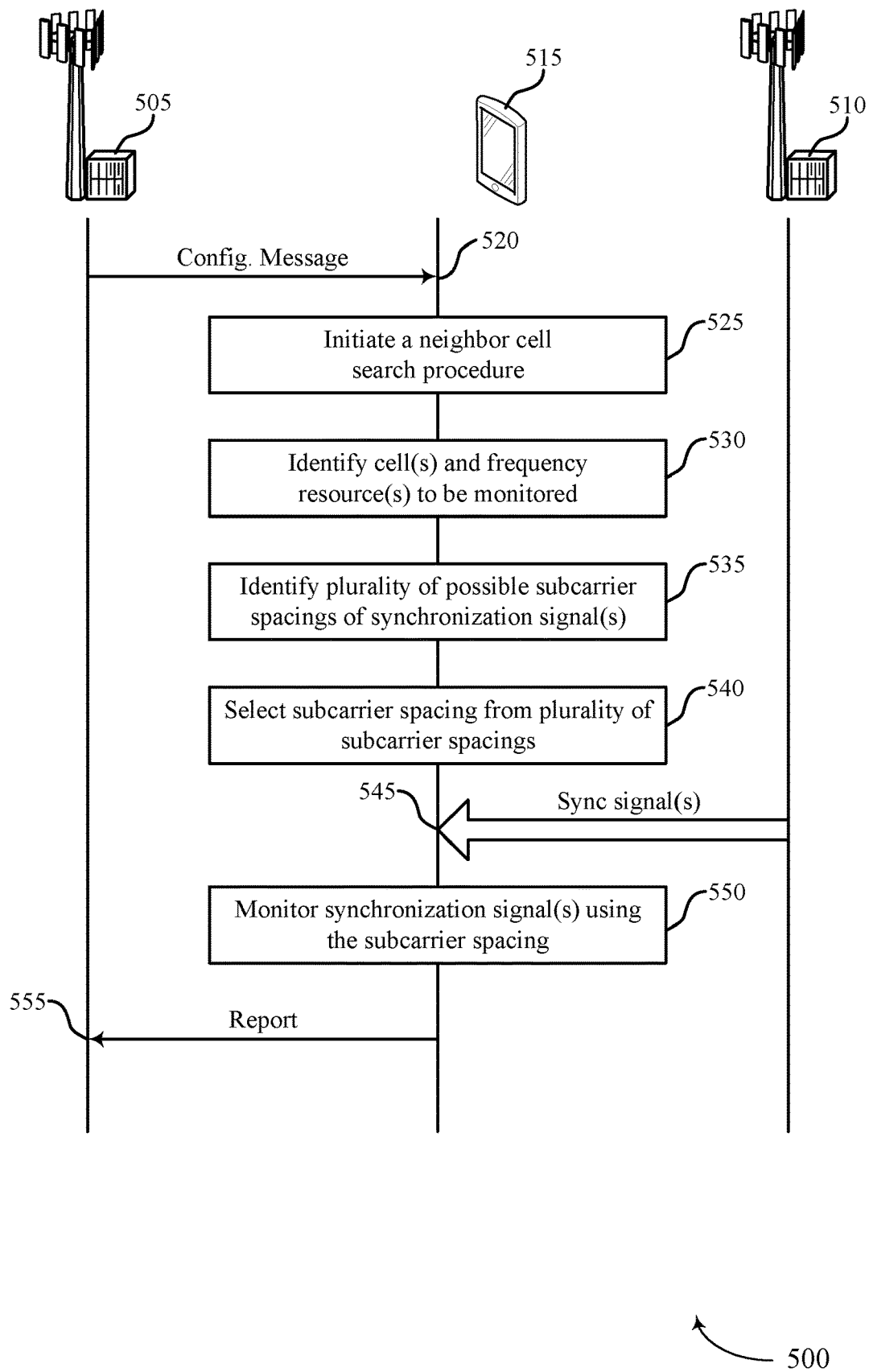
FIG. 5 illustrates an example of a communication scheme that supports techniques for selecting subcarrier spacing for signal detection in accordance with aspects of the present disclosure.

FIG. 5 illustrates an example of a communication scheme 500 that supports techniques for selecting subcarrier spacing for signal detection in accordance with various aspects of the present disclosure. In some examples, the communication scheme 500 may implement aspects of wireless communication systems 100 and 200.

The communication scheme 500 may illustrate a procedure where a UE 515 selects a single subcarrier spacing from a plurality of possible subcarrier spacings when monitoring for the synchronization signals 545 transmitted by a neighboring cell (e.g., transmitted by neighboring base station 510) based on a variety of factors. The communication scheme 500 includes functions performed by and communications exchanged between various combinations of a connected base station 505, the neighboring base station 510, and the UE 515. The connected base station 505 may be an example of base stations 105, 205, 305, 405 described with reference to FIGS. 1-4. The neighboring base station 510 may be an example of base stations 105, 210, 310, 410 described with reference to FIGS. 1-4. The UE may be an example of UEs 115, 215, 315, 415 described with reference to FIGS. 1-4. In some cases, the connected base station 505 may refer to the primary cell connected with the UE 515 and the neighboring base station 510 may refer to a non-connected cell that is within the vicinity of the UE 515.

The procedure outlined in communication scheme 500 is different form the procedure outlined in communication scheme 400 in that the UE 515 only monitors one subcarrier spacing instead of multiple subcarrier spacings. As such, many of the features of communication scheme 500 are similar to the features of communication scheme 400 and full descriptions of those features are not repeated here.

The UE 515 may receive a configuration message 520 from the connected base station 505 indicating that the UE 515 should monitor synchronization signals of certain cells. In some cases, this monitoring may be done as part of a neighboring cell search procedure or another neighboring cell measurement procedure.

At block 525, the UE 515 may initiate the relevant procedures. At block 530, the UE 515 may identify one or more cells and one or more frequency bands to be monitored during the procedure. At block 535, the UE 515 may a plurality of possible subcarrier spacings used to transmit synchronization signals 545 transmitted by the neighboring cell (e.g., the neighboring base station 510) based on configuration message 520.

At block 540, the UE 515 may select a subcarrier spacing from the plurality of possible subcarrier spacings to use when monitoring for the synchronization signals 545. In some cases, the UE 515 may select the subcarrier spacing to be used based on a predetermined configuration. The UE 515 may be preconfigured to search a certain subcarrier spacing for a given frequency band and/or a given cell. For example, in mmW frequency bands, the UE 515 may be configured to monitor using the 120 kHz subcarrier spacing, unless specifically told otherwise. In some situations, the UE 515 may have preconfigured default subcarrier spacings for more specific frequency bands than merely dividing the available spectrum into sub-six bands and mmW bands.

In some cases, the UE 515 may select the subcarrier spacing to be used for monitoring based on information included in a database of the UE 515. As the UE 515 connects to different cells, the UE 515 may identify which subcarrier spacings are used in which frequency bands by the specific cell. The UE 515 may store that information for future use. When the UE 515 attempts to monitor synchronization signals transmitted by a known cell, the UE 515 may select which subcarrier spacing to monitor based on the information included in the database. In some cases, this database is stored locally on the UE 515.

In some cases, the UE 515 may select the subcarrier spacing to be used for monitoring based on information received from a network entity (e.g., the connected base station 505). In fact, the procedures outlined in the communication scheme 300 may be a specific example of the procedures described in the communication scheme 500 in that the selection made by the UE 515 is based on network messaging rather than a local database or a predetermined configuration.

The neighboring cell (e.g., the neighboring base station 510) may transmit a plurality of synchronization signals 545. At block 550, the UE 515 may monitor the synchronization signals using the selected subcarrier spacing.

In some circumstances, the selected subcarrier spacing may be incorrect. In such circumstances, the UE 515 may not be able to receive or decode the synchronization signals 545 using the selected subcarrier spacing. If the UE 515 determines that it cannot detect or receive the synchronization signals 545 as it expects to, the UE 515 may return to block 540 select a different subcarrier spacing for a set of possible subcarrier spacings and monitor the synchronization signals using that different subcarrier spacing. If the different subcarrier spacing is indeed correct and the UE 315 receives the synchronization signals 345, the UE 315 may include the updated subcarrier spacing in the report 355.

It should be noted that the procedures described herein in communication schemes 300, 400, and 500 describe possible implementations, and that the operations and the steps may be rearranged or otherwise modified and that other implementations are possible. Further, aspects from two or more of the communication schemes may be combined.

Figure 6:
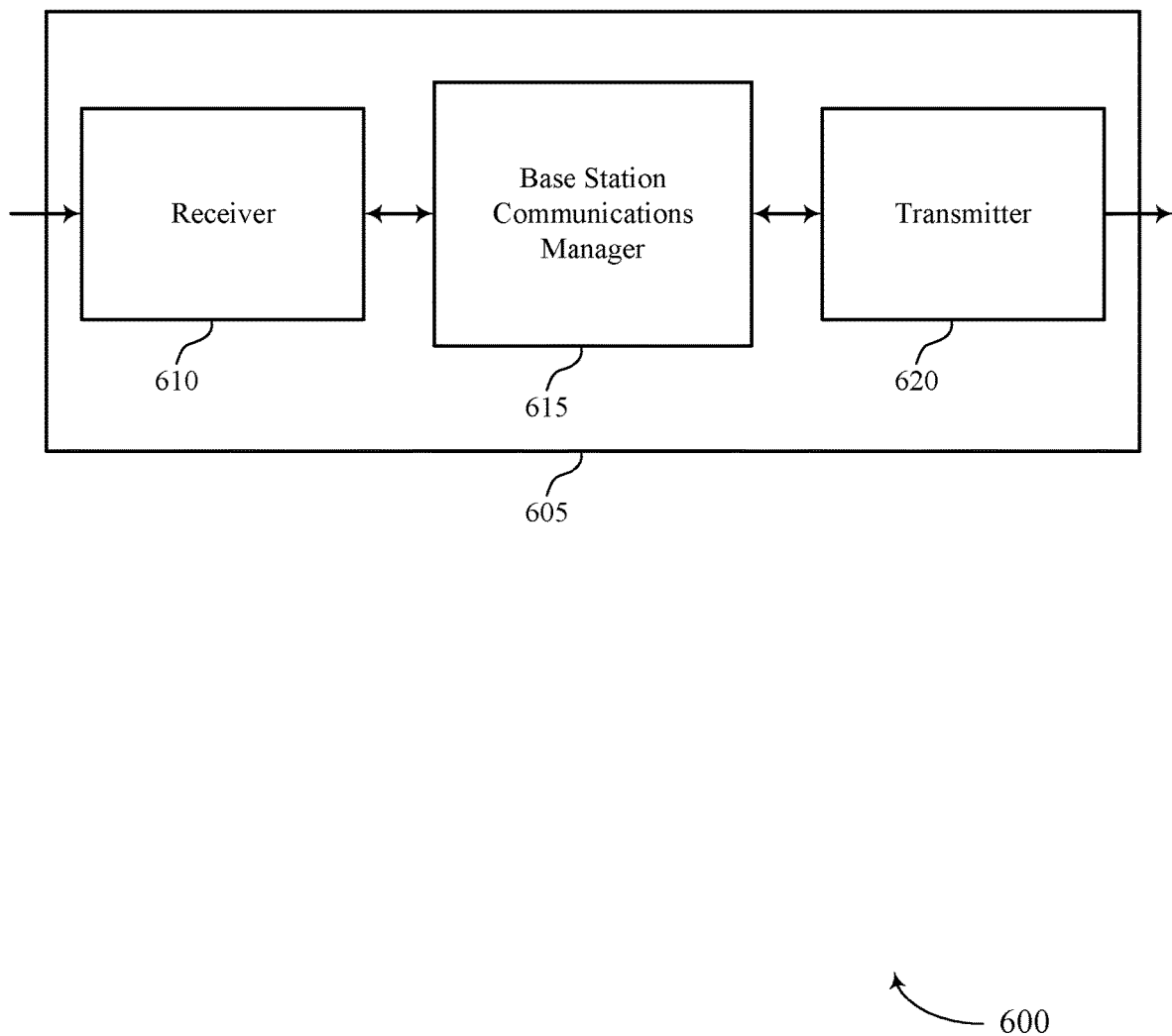
FIGS. 6 through 8 show block diagrams of a device that supports techniques for selecting subcarrier spacing for signal detection in accordance with aspects of the present disclosure.

FIG. 6 shows a block diagram 600 of a wireless device 605 that supports techniques for selecting subcarrier spacing for signal detection in accordance with aspects of the present disclosure. Wireless device 605 may be an example of aspects of a base station 105, 205, 210, 305, 310, 405, 410, 505, 510 as described herein. Wireless device 605 may include receiver 610, base station communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to techniques for selecting subcarrier spacing for signal detection, etc.). Information may be passed on to other components of the device. The receiver 610 may be an example of aspects of the transceiver 935 described with reference to FIG. 9. The receiver 610 may utilize a single antenna or a set of antennas. Receiver 610 may receive a measurement report from the UE based on transmitting the indication.

Base station communications manager 615 may be an example of aspects of the base station communications manager 915 described with reference to FIG. 9. Base station communications manager 615 and/or at least some of its various sub-components may be implemented in hardware, software executed by a processor, firmware, or any combination thereof. If implemented in software executed by a processor, the functions of the base station communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station communications manager 615 and/or at least some of its various sub-components may be physically located at various positions, including being distributed such that portions of functions are implemented at different physical locations by one or more physical devices. In some examples, base station communications manager 615 and/or at least some of its various sub-components may be a separate and distinct component in accordance with various aspects of the present disclosure. In other examples, base station communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 615 may initiate an intra-frequency and inter-frequency search and measurement procedure for a UE connected to the base station, identify a subcarrier spacing of a synchronization signal transmitted by a neighboring cell based on initiating the intra-frequency and inter-frequency search and measurement procedure, and transmit an indication of the subcarrier spacing of the synchronization signal to the UE.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
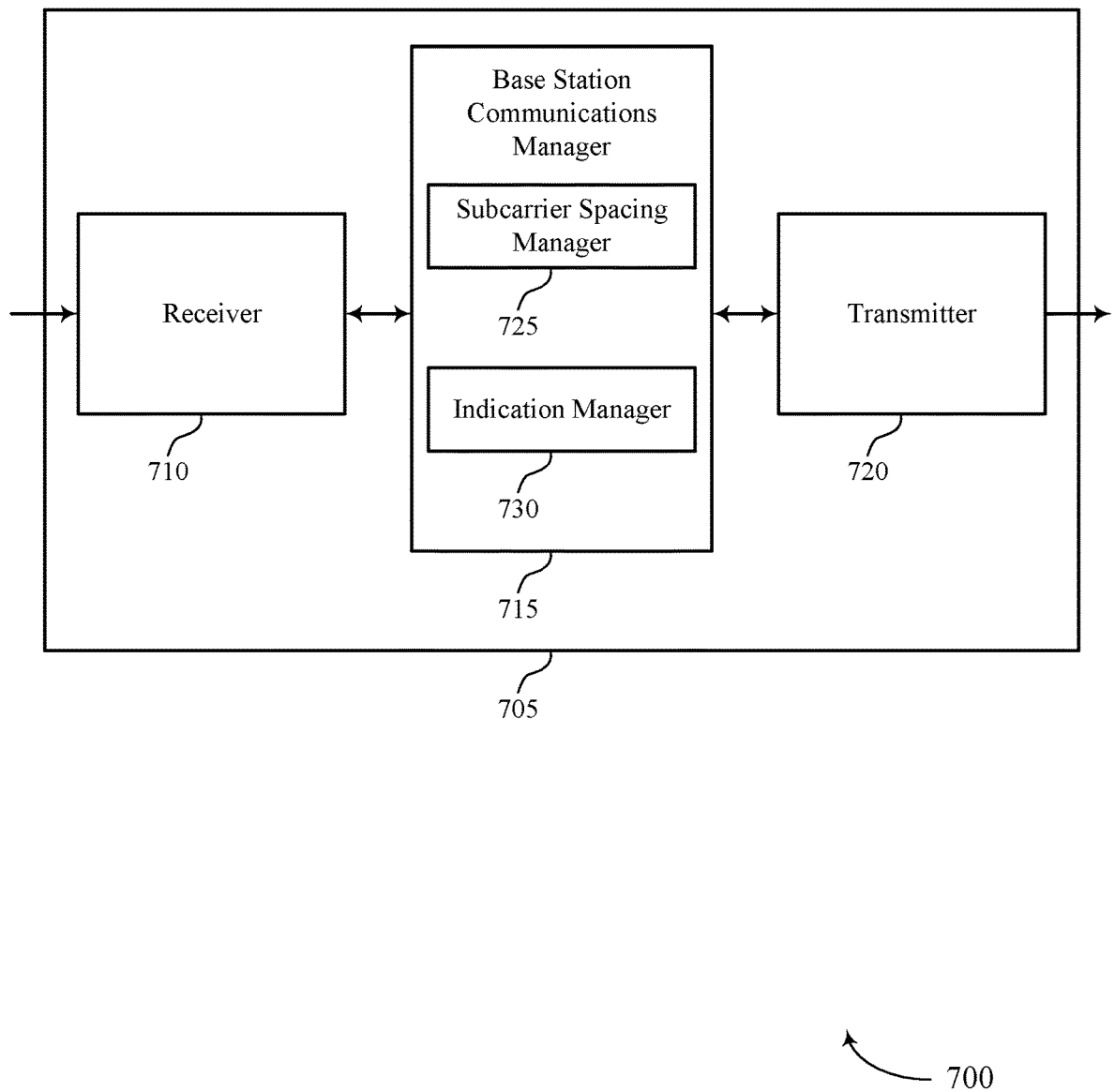

FIG. 7 shows a block diagram 700 of a wireless device 705 that supports techniques for selecting subcarrier spacing for signal detection in accordance with aspects of the present disclosure. Wireless device 705 may be an example of aspects of a wireless device 605 or a base station 105, 205, 210, 305, 310, 405, 410, 505, 510 as described with reference to FIG. 6. Wireless device 705 may include receiver 710, base station communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to techniques for selecting subcarrier spacing for signal detection, etc.). Information may be passed on to other components of the device. The receiver 710 may be an example of aspects of the transceiver 935 described with reference to FIG. 9. The receiver 710 may utilize a single antenna or a set of antennas.

Base station communications manager 715 may be an example of aspects of the base station communications manager 915 described with reference to FIG. 9. Base station communications manager 715 may also include subcarrier spacing manager 725 and indication manager 730.

Subcarrier spacing manager 725 may initiate an intra-frequency and inter-frequency search and measurement procedure for a UE connected to the base station, identify a subcarrier spacing of a synchronization signal transmitted by a neighboring cell based on initiating the intra-frequency and inter-frequency search and measurement procedure, in sub-six radio frequency spectrum bands the subcarrier spacing for the synchronization signal is 15 kilohertz or 30 kilohertz, and in mmW radio frequency spectrum bands the subcarrier spacing for the synchronization signal is 120 kilohertz or 240 kilohertz. In some cases, the identified subcarrier spacing is selected from a set of two possible subcarrier spacings for a given set of radio frequency spectrum band resources.

Indication manager 730 may transmit an indication of the subcarrier spacing of the synchronization signal to the UE. In some cases, the indication is part of a measurement configuration message transmitted by the base station to the UE. In some cases, the indication is a one-bit field. In some cases, the indication is part of a radio resource control (RRC) message.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
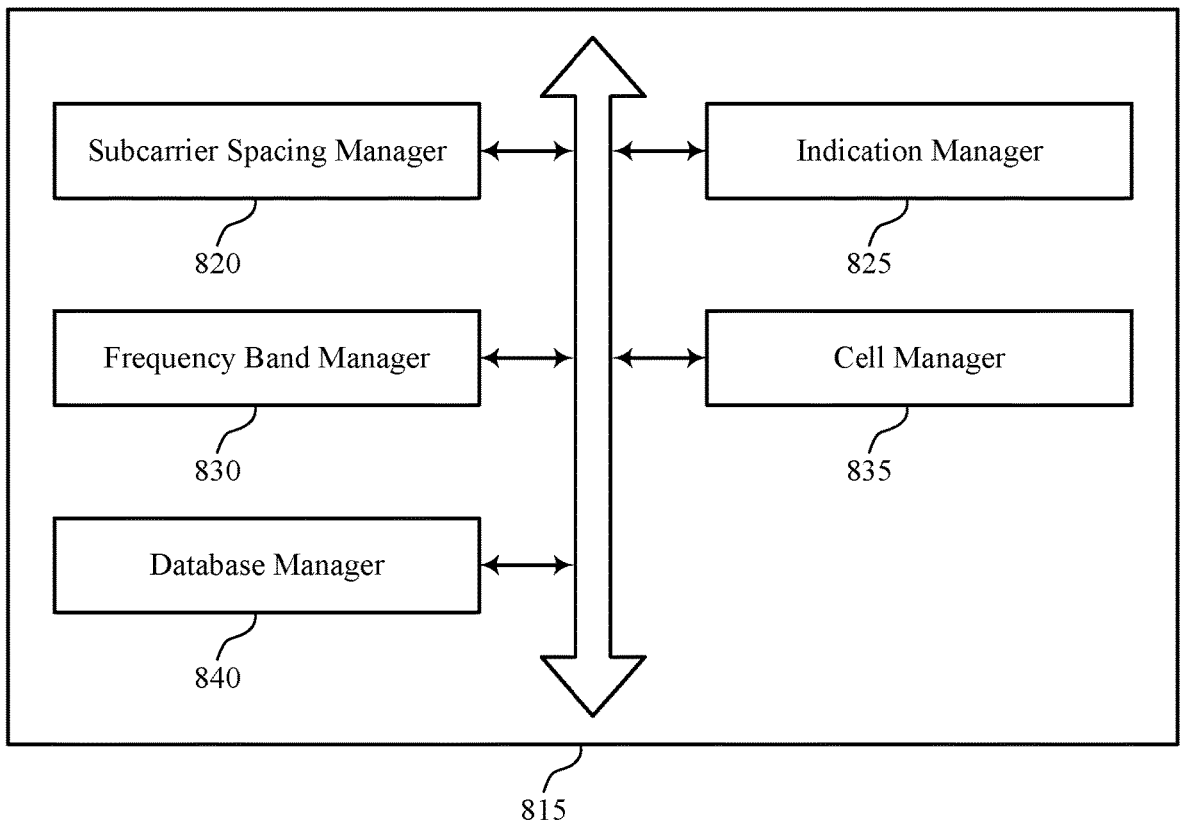

FIG. 8 shows a block diagram 800 of a base station communications manager 815 that supports techniques for selecting subcarrier spacing for signal detection in accordance with aspects of the present disclosure. The base station communications manager 815 may be an example of aspects of a base station communications manager 615, a base station communications manager 715, or a base station communications manager 915 described with reference to FIGS. 6, 7, and 9. The base station communications manager 815 may include subcarrier spacing manager 820, indication manager 825, frequency band manager 830, cell manager 835, and database manager 840. Each of these modules may communicate, directly or indirectly, with one another (e.g., via one or more buses).

Subcarrier spacing manager 820 may initiate an intra-frequency and inter-frequency search and measurement procedure for a UE connected to the base station, identify a subcarrier spacing of a synchronization signal transmitted by a neighboring cell based on initiating the intra-frequency and inter-frequency search and measurement procedure, in sub-six radio frequency spectrum bands the subcarrier spacing for the synchronization signal is 15 kilohertz or 30 kilohertz, and in mmW radio frequency spectrum bands the subcarrier spacing for the synchronization signal is 120 kilohertz or 240 kilohertz. In some cases, the identified subcarrier spacing is selected from a set of two possible subcarrier spacings for a given set of radio frequency spectrum band resources.

Indication manager 825 may transmit an indication of the subcarrier spacing of the synchronization signal to the UE. In some cases, the indication is part of a measurement configuration message transmitted by the base station to the UE. In some cases, the indication is a one-bit field. In some cases, the indication is part of an RRC message.

Frequency band manager 830 may identify one or more radio frequency spectrum band resources to be monitored by the UE during the intra-frequency and inter-frequency search and measurement procedure, where identifying the subcarrier spacing is based on identifying the one or more radio frequency spectrum band resources.

Cell manager 835 may identify the neighboring cell to be monitored by the UE during the intra-frequency and inter-frequency search and measurement procedure, where identifying the subcarrier spacing is based on identifying the neighboring cell.

Database manager 840 may identify a set of subcarrier spacings of synchronization signals transmitted by a set of cells that neighbor the base station and store the set of subcarrier spacings, where identifying the subcarrier spacing of the neighboring cell is based on storing the set of subcarrier spacings.

Figure 9:
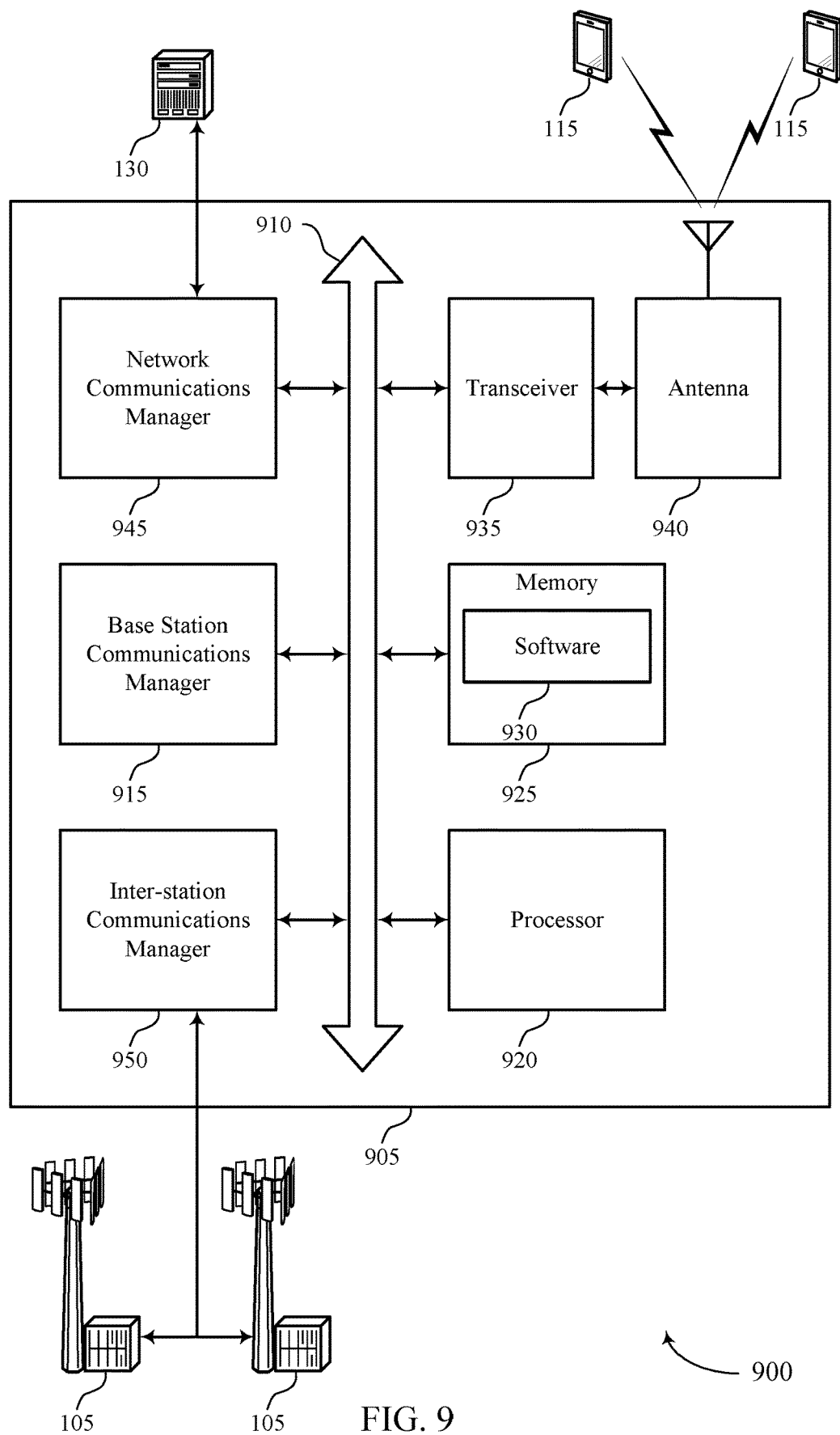
FIG. 9 illustrates a block diagram of a system including a base station that supports techniques for selecting subcarrier spacing for signal detection in accordance with aspects of the present disclosure.

FIG. 9 shows a diagram of a system 900 including a device 905 that supports techniques for selecting subcarrier spacing for signal detection in accordance with aspects of the present disclosure. Device 905 may be an example of or include the components of wireless device 605, wireless device 705, or a base station 105, 205, 210, 305, 310, 405, 410, 505, 510 as described herein, e.g., with reference to FIGS. 6 and 7. Device 905 may include components for bi-directional voice and data communications including components for transmitting and receiving communications, including base station communications manager 915, processor 920, memory 925, software 930, transceiver 935, antenna 940, network communications manager 945, and inter-station communications manager 950. These components may be in electronic communication via one or more buses (e.g., bus 910). Device 905 may communicate wirelessly with one or more UEs 115.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting techniques for selecting subcarrier spacing for signal detection).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support techniques for selecting subcarrier spacing for signal detection. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described herein. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

Network communications manager 945 may manage communications with the core network (e.g., via one or more wired backhaul links). For example, the network communications manager 945 may manage the transfer of data communications for client devices, such as one or more UEs 115.

Inter-station communications manager 950 may manage communications with other base station 105, and may include a controller or scheduler for controlling communications with UEs 115 in cooperation with other base stations 105. For example, the inter-station communications manager 950 may coordinate scheduling for transmissions to UEs 115 for various interference mitigation techniques such as beamforming or joint transmission. In some examples, inter-station communications manager 950 may provide an X2 interface within a Long Term Evolution (LTE)/LTE-A wireless communication network technology to provide communication between base stations 105.

Figure 10:
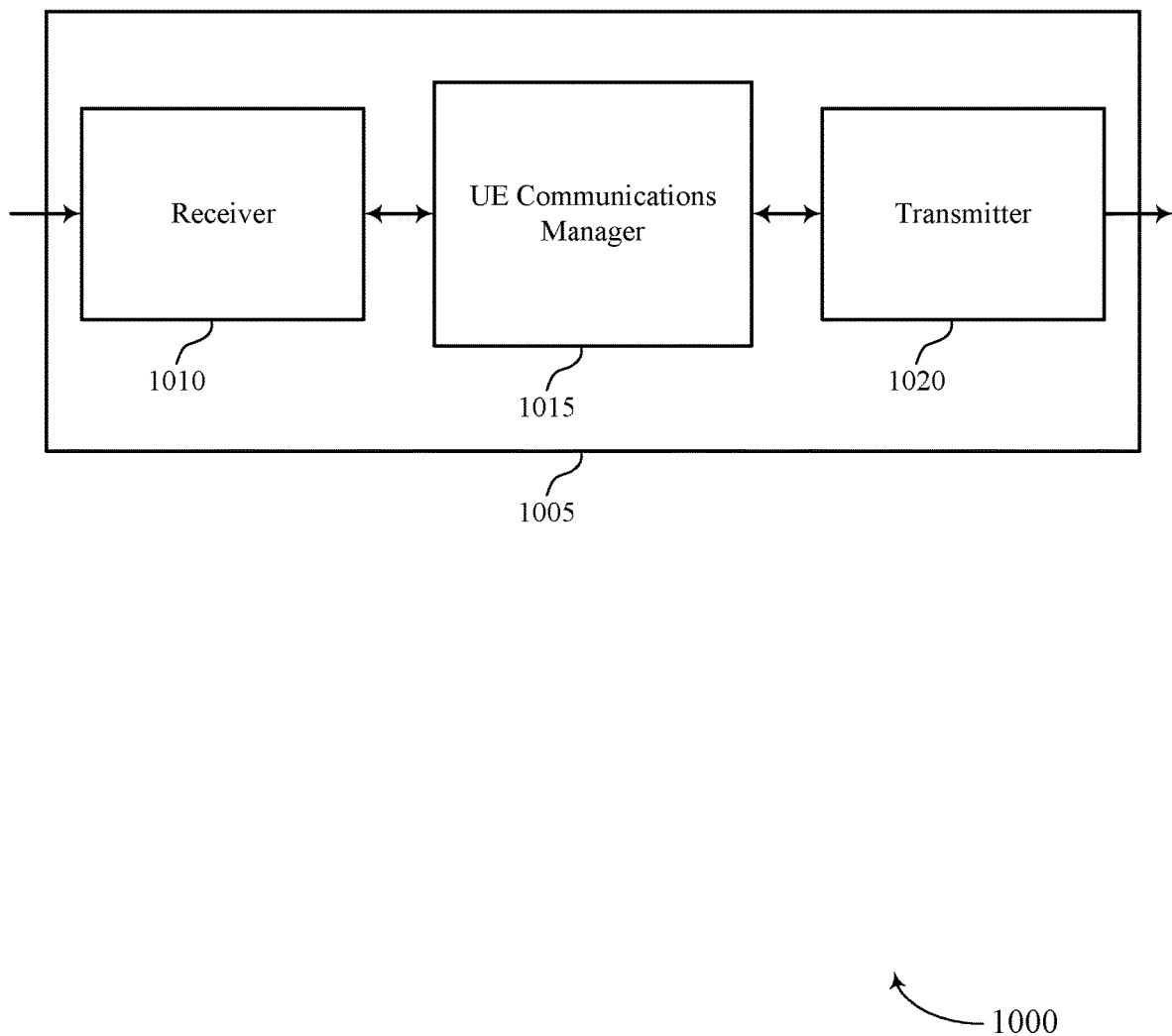
FIGS. 10 through 12 show block diagrams of a device that supports techniques for selecting subcarrier spacing for signal detection in accordance with aspects of the present disclosure.

FIG. 10 shows a block diagram 1000 of a wireless device 1005 that supports techniques for selecting subcarrier spacing for signal detection in accordance with aspects of the present disclosure. Wireless device 1005 may be an example of aspects of a UE 115, 215, 315, 415, 515 as described herein. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to techniques for selecting subcarrier spacing for signal detection, etc.). Information may be passed on to other components of the device. The receiver 1010 may be an example of aspects of the transceiver 1335 described with reference to FIG. 13. The receiver 1010 may utilize a single antenna or a set of antennas.

UE communications manager 1015 may be an example of aspects of the UE communications manager 1315 described with reference to FIG. 13. UE communications manager 1015 and/or at least some of its various sub-components may be implemented in hardware, software executed by a processor, firmware, or any combination thereof. If implemented in software executed by a processor, the functions of the UE communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 1015 and/or at least some of its various sub-components may be physically located at various positions, including being distributed such that portions of functions are implemented at different physical locations by one or more physical devices. In some examples, UE communications manager 1015 and/or at least some of its various sub-components may be a separate and distinct component in accordance with various aspects of the present disclosure. In other examples, UE communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1015 may identify one or more radio frequency spectrum band resources to be monitored by the UE during an intra-frequency and inter-frequency search and measurement procedure, identify a set of subcarrier spacings of a synchronization signal transmitted by a neighboring cell associated with the one or more radio frequency spectrum band resources, and monitor the synchronization signal of the neighboring cell using each of the set of subcarrier spacings. The UE communications manager 1015 may also initiate an intra-frequency and inter-frequency search and measurement procedure, identify a subcarrier spacing of a synchronization signal transmitted by a neighboring cell from a set of possible subcarrier spacings of the synchronization signal based on initiating the intra-frequency and inter-frequency search and measurement procedure, and monitor the synchronization signal of the neighboring cell using the identified subcarrier spacing.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
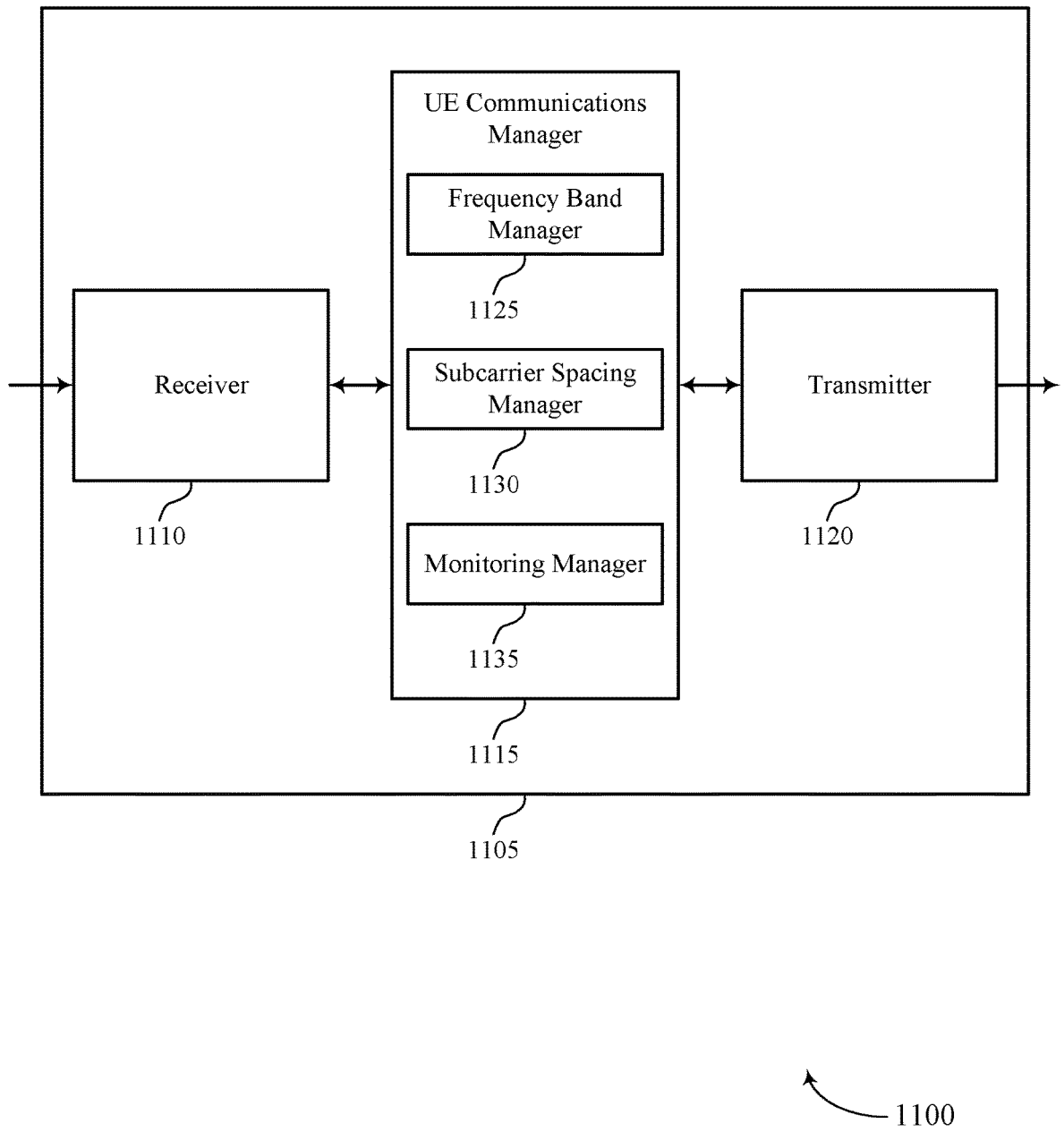

FIG. 11 shows a block diagram 1100 of a wireless device 1105 that supports techniques for selecting subcarrier spacing for signal detection in accordance with aspects of the present disclosure. Wireless device 1105 may be an example of aspects of a wireless device 1005 or a UE 115, 215, 315, 415, 515 as described with reference to FIG. 10. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to techniques for selecting subcarrier spacing for signal detection, etc.). Information may be passed on to other components of the device. The receiver 1110 may be an example of aspects of the transceiver 1335 described with reference to FIG. 13. The receiver 1110 may utilize a single antenna or a set of antennas.

UE communications manager 1115 may be an example of aspects of the UE communications manager 1315 described with reference to FIG. 13. UE communications manager 1115 may also include frequency band manager 1125, subcarrier spacing manager 1130, and monitoring manager 1135.

Frequency band manager 1125 may identify one or more radio frequency spectrum band resources to be monitored by the UE during an intra-frequency and inter-frequency search and measurement procedure and identify one or more radio frequency spectrum band resources to be monitored during the intra-frequency and inter-frequency search and measurement procedure, where identifying the subcarrier spacing is based on identifying the one or more radio frequency spectrum band resources.

Subcarrier spacing manager 1130 may identify a set of subcarrier spacings of a synchronization signal transmitted by a neighboring cell associated with the one or more radio frequency spectrum band resources, in sub-six radio frequency spectrum bands the set of subcarrier spacings for the synchronization signal is 15 kilohertz or 30 kilohertz, in mmW radio frequency spectrum bands the set of subcarrier spacings for the synchronization signal is 120 kilohertz or 240 kilohertz, initiate an intra-frequency and inter-frequency search and measurement procedure, and identify a subcarrier spacing of a synchronization signal transmitted by a neighboring cell from a set of possible subcarrier spacings of the synchronization signal based on initiating the intra-frequency and inter-frequency search and measurement procedure. In some cases, the set of subcarrier spacings includes a set of two possible subcarrier spacings for a given set of radio frequency spectrum band resources.

Monitoring manager 1135 may monitor the synchronization signal of the neighboring cell using each of the set of subcarrier spacings, monitor each of the set of subcarrier spacings is based on failing to receive an indication from a base station about a subcarrier spacing associated with a specific synchronization signal, and monitor the synchronization signal of the neighboring cell using the identified subcarrier spacing.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
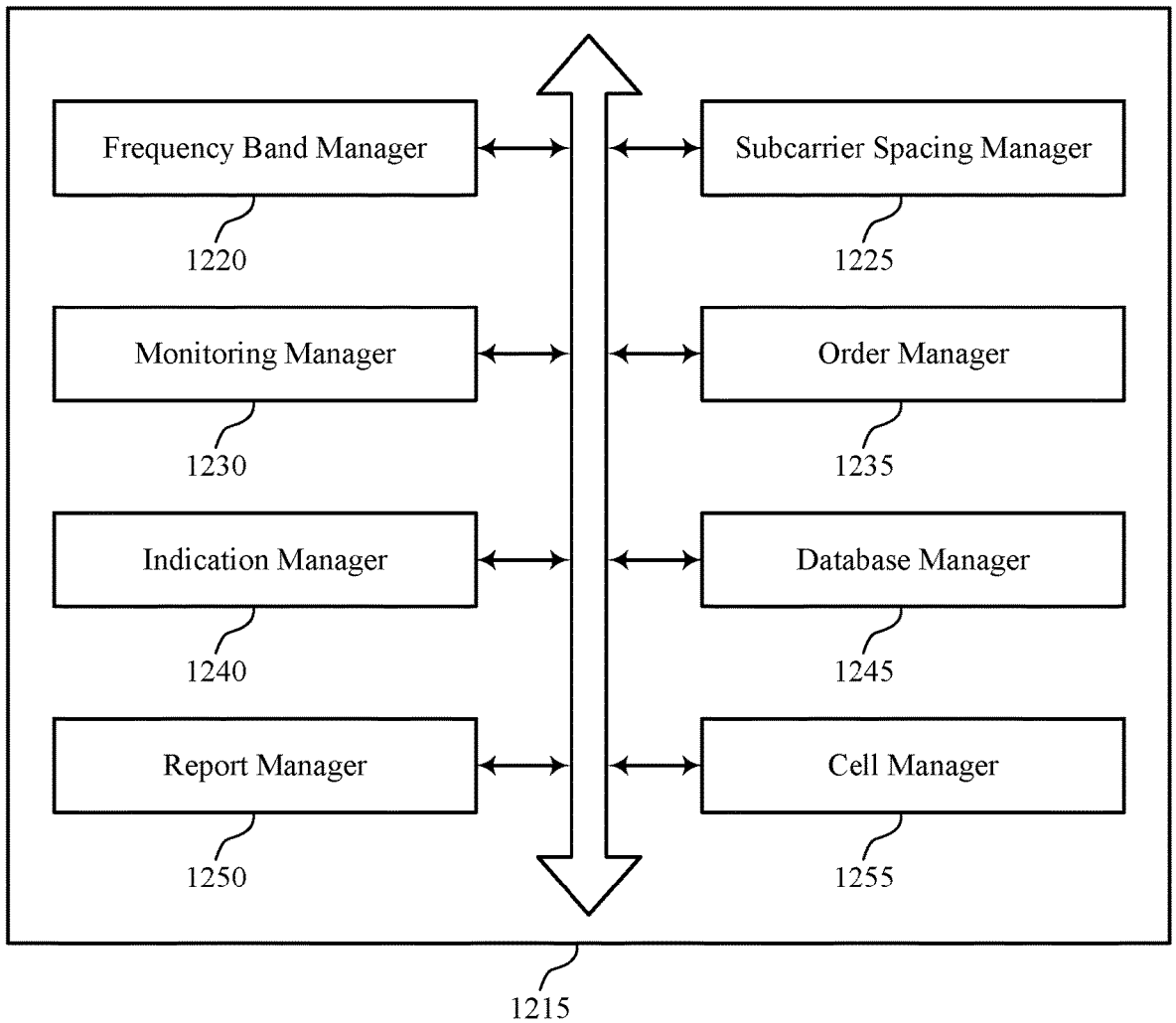

FIG. 12 shows a block diagram 1200 of a UE communications manager 1215 that supports techniques for selecting subcarrier spacing for signal detection in accordance with aspects of the present disclosure. The UE communications manager 1215 may be an example of aspects of a UE communications manager 1315 described with reference to FIGS. 10, 11, and 13. The UE communications manager 1215 may include frequency band manager 1220, subcarrier spacing manager 1225, monitoring manager 1230, order manager 1235, indication manager 1240, database manager 1245, report manager 1250, and cell manager 1255. Each of these modules may communicate, directly or indirectly, with one another (e.g., via one or more buses).

Frequency band manager 1220 may identify one or more radio frequency spectrum band resources to be monitored by the UE during an intra-frequency and inter-frequency search and measurement procedure and identify one or more radio frequency spectrum band resources to be monitored during the intra-frequency and inter-frequency search and measurement procedure, where identifying the subcarrier spacing is based on identifying the one or more radio frequency spectrum band resources.

Subcarrier spacing manager 1225 may identify a set of subcarrier spacings of a synchronization signal transmitted by a neighboring cell associated with the one or more radio frequency spectrum band resources, in sub-six radio frequency spectrum bands the set of subcarrier spacings for the synchronization signal is 15 kilohertz or 30 kilohertz, in mmW radio frequency spectrum bands the set of subcarrier spacings for the synchronization signal is 120 kilohertz or 240 kilohertz, initiate an intra-frequency and inter-frequency search and measurement procedure, and identify a subcarrier spacing of a synchronization signal transmitted by a neighboring cell from a set of possible subcarrier spacings of the synchronization signal based on initiating the intra-frequency and inter-frequency search and measurement procedure. In some cases, the set of subcarrier spacings includes a set of two possible subcarrier spacings for a given set of radio frequency spectrum band resources.

Monitoring manager 1230 may monitor the synchronization signal of the neighboring cell using each of the set of subcarrier spacings, monitor each of the set of subcarrier spacings is based on failing to receive an indication from a base station about a subcarrier spacing associated with a specific synchronization signal, and monitor the synchronization signal of the neighboring cell using the identified subcarrier spacing.

Order manager 1235 may determine a search order for the set of subcarrier spacings, where monitoring the synchronization signal includes monitoring the synchronization signal using a first subcarrier spacing in the search order and monitoring the synchronization signal using a second subcarrier spacing in the search order after using the first subcarrier spacing and identify the first subcarrier spacing from the set of subcarrier spacings based on a preconfigured order, where determining the search order is based on using the preconfigured order.

Indication manager 1240 may receive an indication from a base station indicating a subcarrier spacing associated with a specific synchronization signal, where determining the search order is based on receiving the indication and receive an indication of the subcarrier spacing of the synchronization signal from a base station, where identifying the subcarrier spacing is based on receiving the indication.

Database manager 1245 may identify the first subcarrier spacing from the set of subcarrier spacings using a database of subcarrier spacings stored by the UE, where determining the search order is based on using the database of subcarrier spacings stored by the UE, identify a subcarrier spacing of a specific synchronization signal transmitted by a cell connected to the UE, store the subcarrier spacing of the cell, where identifying the set of subcarrier spacings of the neighboring cell is based on storing the subcarrier spacing, and search a database of subcarrier spacings stored on the UE, where identifying the subcarrier spacing is based on identifying the neighboring cell.

Report manager 1250 may transmit a measurement report to a base station based on monitoring the synchronization signal using each of the set of subcarrier spacings.

Cell manager 1255 may identify the neighboring cell to be monitored during the intra-frequency and inter-frequency search and measurement procedure, where identifying the subcarrier spacing is based on identifying the neighboring cell.

Figure 13:
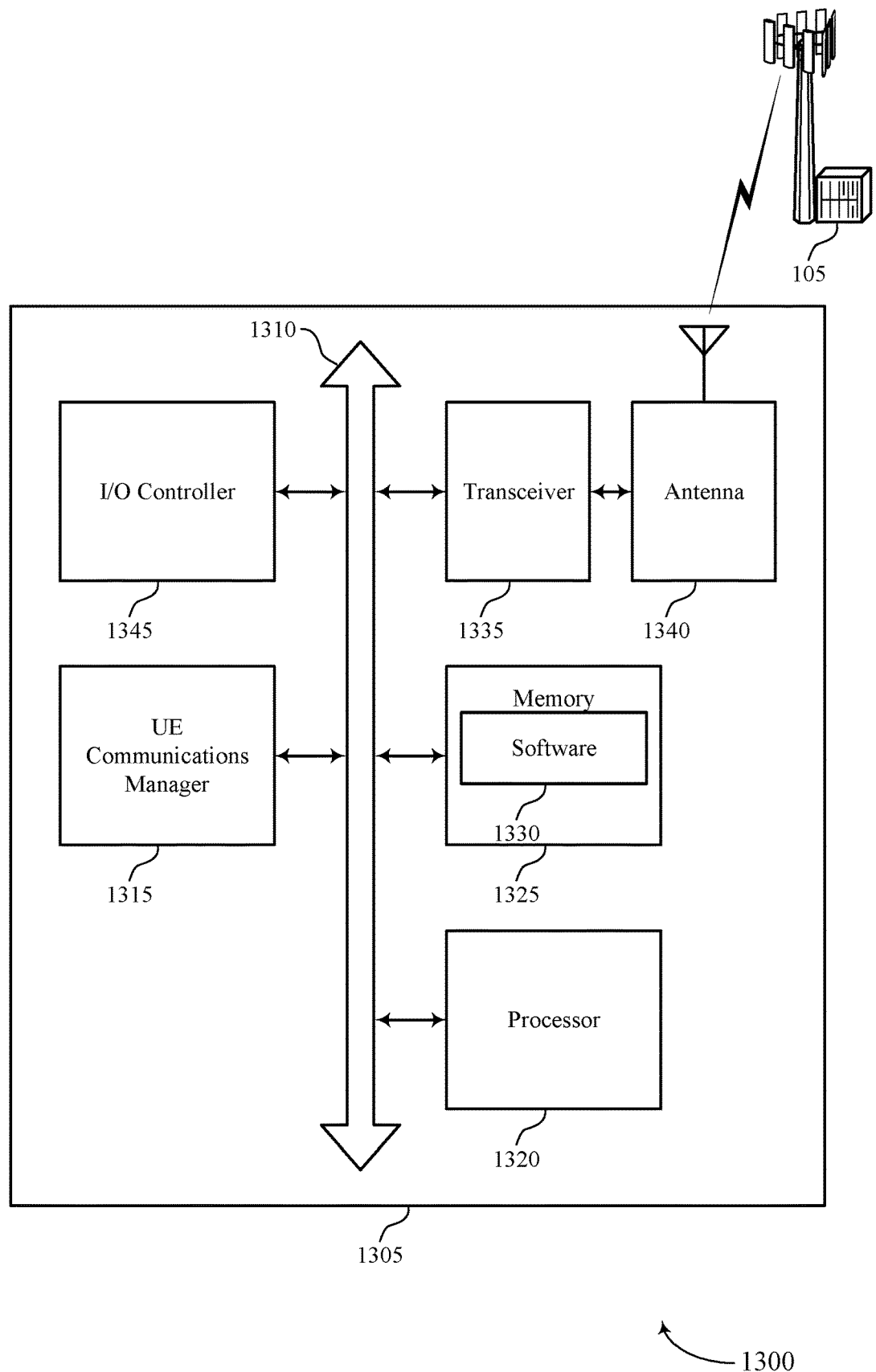
FIG. 13 illustrates a block diagram of a system including a UE that supports techniques for selecting subcarrier spacing for signal detection in accordance with aspects of the present disclosure.

FIG. 13 shows a diagram of a system 1300 including a device 1305 that supports techniques for selecting subcarrier spacing for signal detection in accordance with aspects of the present disclosure. Device 1305 may be an example of or include the components of UE 115, 215, 315, 415, 515 as described herein, e.g., with reference to FIGS. 1-5. Device 1305 may include components for bi-directional voice and data communications including components for transmitting and receiving communications, including UE communications manager 1315, processor 1320, memory 1325, software 1330, transceiver 1335, antenna 1340, and I/O controller 1345. These components may be in electronic communication via one or more buses (e.g., bus 1310). Device 1305 may communicate wirelessly with one or more base stations 105.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting techniques for selecting subcarrier spacing for signal detection).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support techniques for selecting subcarrier spacing for signal detection. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described herein. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system. In other cases, I/O controller 1345 may represent or interact with a modem, a keyboard, a mouse, a touchscreen, or a similar device. In some cases, I/O controller 1345 may be implemented as part of a processor. In some cases, a user may interact with device 1305 via I/O controller 1345 or via hardware components controlled by I/O controller 1345.

Figure 14:
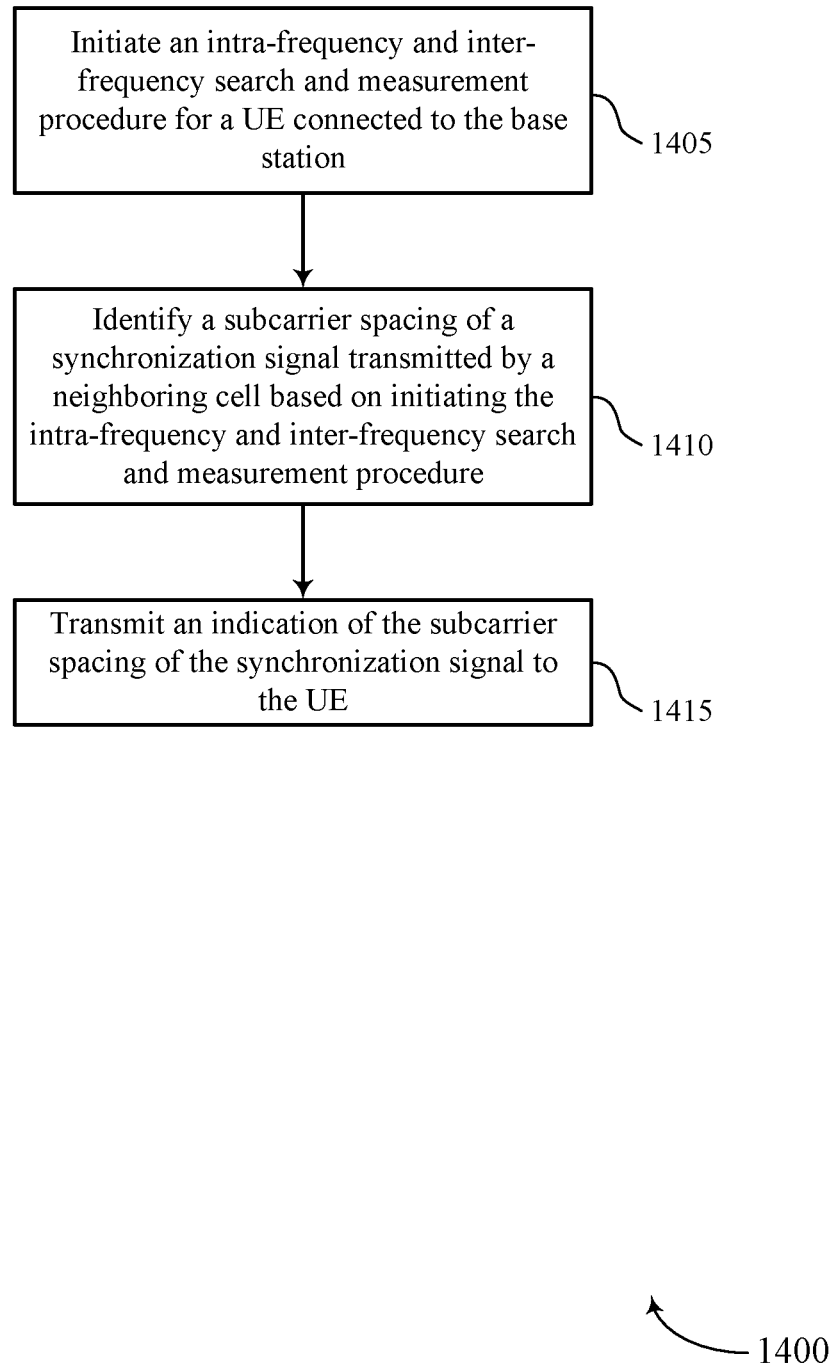
FIGS. 14 through 16 illustrate methods for techniques for selecting subcarrier spacing for signal detection in accordance with aspects of the present disclosure.

FIG. 14 shows a flowchart illustrating a method 1400 for techniques for selecting subcarrier spacing for signal detection in accordance with aspects of the present disclosure. The operations of method 1400 may be implemented by a base station 105, 205, 210, 305, 310, 405, 410, 505, 510 or its components as described herein. For example, the operations of method 1400 may be performed by a base station communications manager as described with reference to FIGS. 6 through 9. In some examples, a base station 105, 205, 210, 305, 310, 405, 410, 505, 510 may execute a set of codes to control the functional elements of the device to perform the functions described herein. Additionally or alternatively, the base station 105 may perform aspects of the functions described herein using special-purpose hardware.

At block 1405 the base station 105 may initiate an intra-frequency and inter-frequency search and measurement procedure for a UE connected to the base station. The operations of block 1405 may be performed according to the methods described herein. In certain examples, aspects of the operations of block 1405 may be performed by a subcarrier spacing manager as described with reference to FIGS. 6 through 9.

At block 1410 the base station 105 may identify a subcarrier spacing of a synchronization signal transmitted by a neighboring cell based at least in part on initiating the intra-frequency and inter-frequency search and measurement procedure. The operations of block 1410 may be performed according to the methods described herein. In certain examples, aspects of the operations of block 1410 may be performed by a subcarrier spacing manager as described with reference to FIGS. 6 through 9.

At block 1415 the base station 105 may transmit an indication of the subcarrier spacing of the synchronization signal to the UE. The operations of block 1415 may be performed according to the methods described herein. In certain examples, aspects of the operations of block 1415 may be performed by an indication manager as described with reference to FIGS. 6 through 9.

Figure 15:
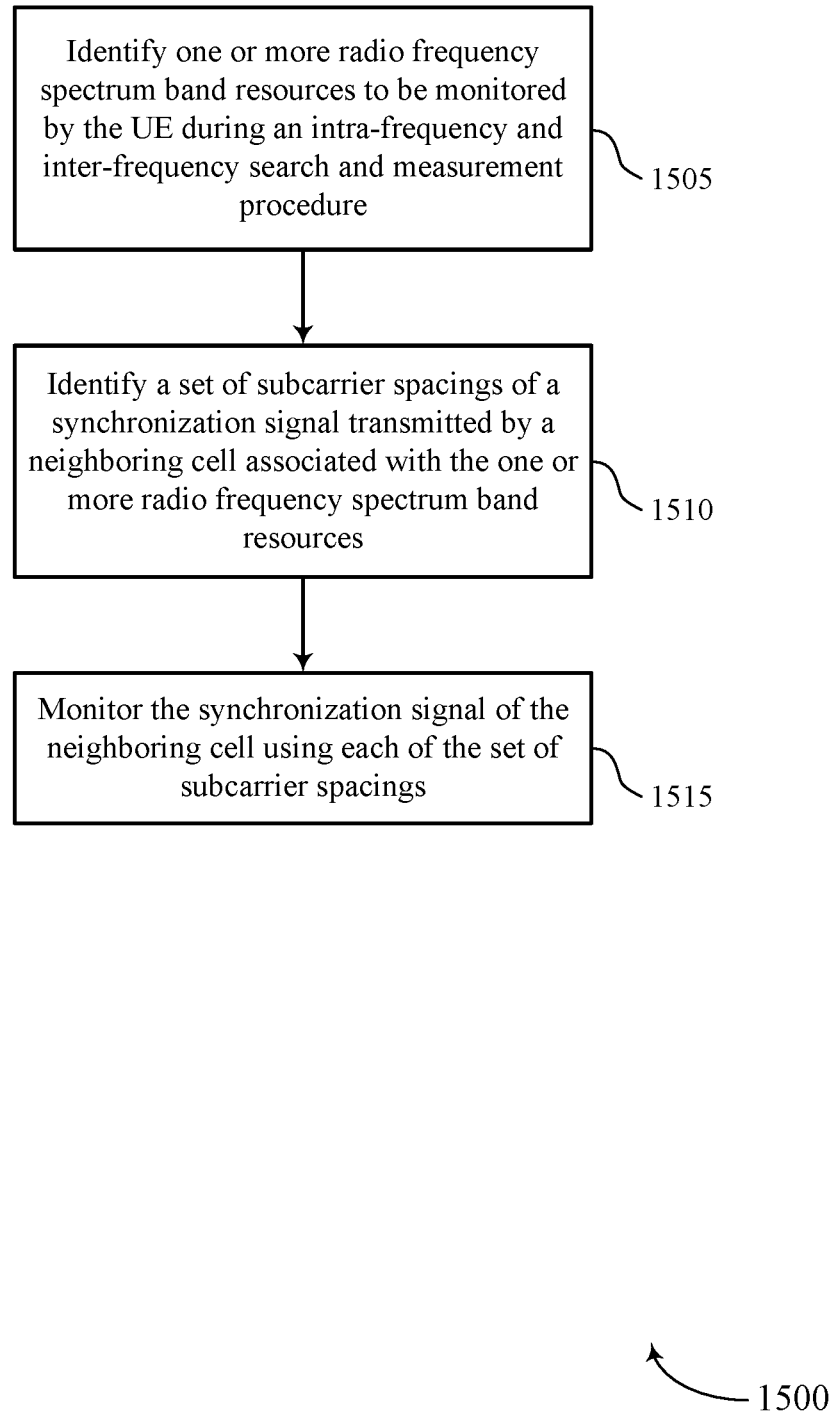

FIG. 15 shows a flowchart illustrating a method 1500 for techniques for selecting subcarrier spacing for signal detection in accordance with aspects of the present disclosure. The operations of method 1500 may be implemented by a UE 115, 215, 315, 415, 515 or its components as described herein. For example, the operations of method 1500 may be performed by a UE communications manager as described with reference to FIGS. 10 through 13. In some examples, a UE 115, 215, 315, 415, 515 may execute a set of codes to control the functional elements of the device to perform the functions described herein. Additionally or alternatively, the UE 115, 215, 315, 415, 515 may perform aspects of the functions described herein using special-purpose hardware.

At block 1505 the UE 115 may identify one or more radio frequency spectrum band resources to be monitored by the UE during an intra-frequency and inter-frequency search and measurement procedure. The operations of block 1505 may be performed according to the methods described herein. In certain examples, aspects of the operations of block 1505 may be performed by a frequency band manager as described with reference to FIGS. 10 through 13.

At block 1510 the UE 115 may identify a plurality of subcarrier spacings of a synchronization signal transmitted by a neighboring cell associated with the one or more radio frequency spectrum band resources. The operations of block 1510 may be performed according to the methods described herein. In certain examples, aspects of the operations of block 1510 may be performed by a subcarrier spacing manager as described with reference to FIGS. 10 through 13.

At block 1515 the UE 115 may monitor the synchronization signal of the neighboring cell using each of the plurality of subcarrier spacings. The operations of block 1515 may be performed according to the methods described herein. In certain examples, aspects of the operations of block 1515 may be performed by a monitoring manager as described with reference to FIGS. 10 through 13.

Figure 16:
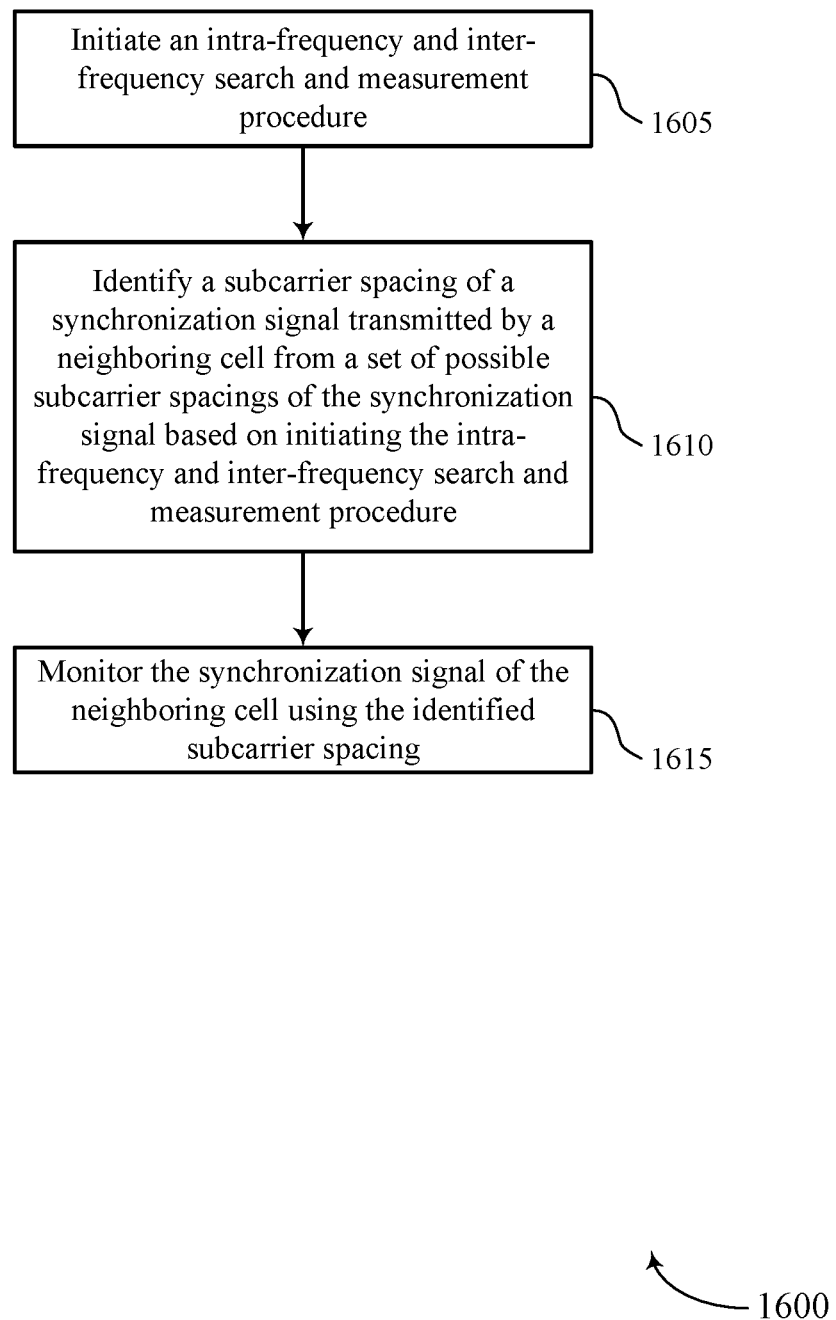

FIG. 16 shows a flowchart illustrating a method 1600 for techniques for selecting subcarrier spacing for signal detection in accordance with aspects of the present disclosure. The operations of method 1600 may be implemented by a UE 115, 215, 315, 415, 515 or its components as described herein. For example, the operations of method 1600 may be performed by a UE communications manager as described with reference to FIGS. 10 through 13. In some examples, a UE 115, 215, 315, 415, 515 may execute a set of codes to control the functional elements of the device to perform the functions described herein. Additionally or alternatively, the UE 115, 215, 315, 415, 515 may perform aspects of the functions described herein using special-purpose hardware.

At block 1605 the UE 115 may initiate an intra-frequency and inter-frequency search and measurement procedure. The operations of block 1605 may be performed according to the methods described herein. In certain examples, aspects of the operations of block 1605 may be performed by a subcarrier spacing manager as described with reference to FIGS. 10 through 13.

At block 1610 the UE 115 may identify a subcarrier spacing of a synchronization signal transmitted by a neighboring cell from a plurality of possible subcarrier spacings of the synchronization signal based at least in part on initiating the intra-frequency and inter-frequency search and measurement procedure. The operations of block 1610 may be performed according to the methods described herein. In certain examples, aspects of the operations of block 1610 may be performed by a subcarrier spacing manager as described with reference to FIGS. 10 through 13.

At block 1615 the UE 115 may monitor the synchronization signal of the neighboring cell using the identified subcarrier spacing. The operations of block 1615 may be performed according to the methods described herein. In certain examples, aspects of the operations of block 1615 may be performed by a monitoring manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA, or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a base station, comprising:
   initiating an intra-frequency and inter-frequency search and measurement procedure for a user equipment (UE) connected to the base station;
   identifying which one or more radio frequency spectrum band resources of a plurality of radio frequency spectrum band resources are to be monitored by the UE during the intra-frequency and inter-frequency search and measurement procedure;
   identifying a subcarrier spacing of a synchronization signal transmitted by a neighboring cell based at least in part on identifying which one or more radio frequency spectrum band resources are to be monitored; and
   transmitting an indication of the subcarrier spacing of the synchronization signal to the UE.

2. The method of claim 1, further comprising:
   identifying the neighboring cell to be monitored by the UE during the intra-frequency and inter-frequency search and measurement procedure, wherein identifying the subcarrier spacing is based at least in part on identifying the neighboring cell.

3. The method of claim 1, wherein:
   the identified subcarrier spacing is selected from a set of two possible subcarrier spacings for a given set of radio frequency spectrum band resources.

4. The method of claim 3, wherein in sub-six radio frequency spectrum bands the subcarrier spacing for the synchronization signal is 15 kilohertz or 30 kilohertz.

5. The method of claim 3, wherein in millimeter wave (mmW) radio frequency spectrum bands the subcarrier spacing for the synchronization signal is 120 kilohertz or 240 kilohertz.

6. The method of claim 1, further comprising:
   identifying a plurality of subcarrier spacings of synchronization signals transmitted by a plurality of cells that neighbor the base station; and
   storing the plurality of subcarrier spacings, wherein identifying the subcarrier spacing of the neighboring cell is based at least in part on storing the plurality of subcarrier spacings.

7. The method of claim 1, further comprising:
receiving a measurement report from the UE based at least in part on transmitting the indication.

8. The method of claim 1, wherein:
the indication is part of a measurement configuration message transmitted by the base station to the UE.

9. The method of claim 1, wherein:
the indication is a one-bit field.

10. The method of claim 1, wherein:
the indication is part of a radio resource control (RRC) message.

11. A method for wireless communication at a user equipment (UE), comprising:
receiving an indication, from a base station, indicating one or more radio frequency spectrum band resources to be monitored by the UE during an intra-frequency and inter-frequency search and measurement procedure;
identifying the one or more radio frequency spectrum band resources to be monitored by the UE during the intra-frequency and inter-frequency search and measurement procedure based on the received indication;
identifying a plurality of subcarrier spacings of a synchronization signal transmitted by a neighboring cell, the plurality of subcarrier spacings being associated with the one or more radio frequency spectrum band resources identified to be monitored; and
performing the search and measurement procedure by monitoring the synchronization signal of the neighboring cell using one or more of the plurality of subcarrier spacings.

12. The method of claim 11, further comprising:
determining a search order for the plurality of subcarrier spacings, wherein monitoring the synchronization signal comprises monitoring the synchronization signal using a first subcarrier spacing in the search order and monitoring the synchronization signal using a second subcarrier spacing in the search order after using the first subcarrier spacing.

13. The method of claim 12:
the indication from a base station further indicates a subcarrier spacing associated with a specific synchronization signal, wherein determining the search order is based at least in part on receiving the indication.

14. The method of claim 12, further comprising:
identifying the first subcarrier spacing from the plurality of subcarrier spacings using a database of subcarrier spacings stored by the UE, wherein determining the search order is based at least in part on using the database of subcarrier spacings stored by the UE.

15. The method of claim 12, further comprising:
identifying the first subcarrier spacing from the plurality of subcarrier spacings based on a preconfigured order, wherein determining the search order is based at least in part on using the preconfigured order.

16. The method of claim 11, further comprising:
transmitting a measurement report to a base station based at least in part on monitoring the synchronization signal using the one or more of the plurality of subcarrier spacings.

17. The method of claim 11, further comprising:
identifying a subcarrier spacing of a specific synchronization signal transmitted by a cell connected to the UE; and
storing the subcarrier spacing of the cell, wherein identifying the plurality of subcarrier spacings of the neighboring cell is based at least in part on storing the subcarrier spacing.

18. The method of claim 11, wherein:
the plurality of subcarrier spacings includes a set of two possible subcarrier spacings for a given set of radio frequency spectrum band resources.

19. The method of claim 18, wherein in sub-six radio frequency spectrum bands the plurality of subcarrier spacings for the synchronization signal is 15 kilohertz or 30 kilohertz.

20. The method of claim 18, wherein in millimeter wave (mmW) radio frequency spectrum bands the plurality of subcarrier spacings for the synchronization signal is 120 kilohertz or 240 kilohertz.

21. The method of claim 11, further comprising:
monitoring each of the plurality of subcarrier spacings based at least in part on failing to receive an indication from a base station about a subcarrier spacing associated with a specific synchronization signal.

22. The method of claim 11, wherein monitoring the synchronization signal of the neighboring cell is performed using the one or more of the plurality of subcarrier spacings after the synchronization signal is detected using one of the plurality of subcarrier spacings.

23. A method for wireless communication at a user equipment (UE), comprising:
initiating an intra-frequency and inter-frequency search and measurement procedure;
receiving an indication, from a base station, indicating one or more radio frequency spectrum band resources to be monitored by the UE during the intra-frequency and inter-frequency search and measurement procedure;
identifying the one or more radio frequency spectrum band resources of a plurality of radio frequency spectrum band resources are to be monitored during the intra-frequency and inter-frequency search and measurement procedure based on the received indication;
identifying a subcarrier spacing of a synchronization signal transmitted by a neighboring cell from a plurality of possible subcarrier spacings of the synchronization signal based at least in part on identifying which one or more radio frequency spectrum band resources are to be monitored, the plurality of subcarrier spacings being associated with which one or more radio frequency spectrum band resources are to be monitored; and
monitoring the synchronization signal of the neighboring cell using the identified subcarrier spacing.

24. The method of claim 23, further comprising:
receiving an indication of the subcarrier spacing of the synchronization signal from a base station, wherein identifying the subcarrier spacing is based at least in part on receiving the indication.

25. The method of claim 23, further comprising:
identifying the neighboring cell to be monitored during the intra-frequency and inter-frequency search and measurement procedure, wherein identifying the subcarrier spacing is based at least in part on identifying the neighboring cell.

26. The method of claim 23, further comprising:
searching a database of subcarrier spacings stored on the UE, wherein identifying the subcarrier spacing is based at least in part on identifying the neighboring cell.

27. An apparatus for wireless communication at a base station, comprising:

a processor, memory in electronic communication with the processor; and instructions stored in the memory and executable by the processor to cause the apparatus to:

initiate an intra-frequency and inter-frequency search and measurement procedure for a user equipment (UE) connected to the base station;

identify which one or more radio frequency spectrum band resources of a plurality of radio frequency spectrum band resources are to be monitored by the UE during the intra-frequency and inter-frequency search and measurement procedure;

identify a subcarrier spacing of a synchronization signal transmitted by a neighboring cell based at least in part on identifying which one or more radio frequency spectrum band resources are to be monitored; and transmit an indication of the subcarrier spacing of the synchronization signal to the UE.

28. The apparatus of claim 27, wherein the instructions are further executable by the processor to cause the apparatus to:

identify the neighboring cell to be monitored by the UE during the intra-frequency and inter-frequency search and measurement procedure, wherein identifying the subcarrier spacing is based at least in part on identifying the neighboring cell.

29. The apparatus of claim 27, wherein:

the identified subcarrier spacing is selected from a set of two possible subcarrier spacings for a given set of radio frequency spectrum band resources.

30. The apparatus of claim 29, wherein in sub-six radio frequency spectrum bands, the subcarrier spacing for the synchronization signal is 15 kilohertz or 30 kilohertz.

31. The apparatus of claim 29, wherein, in millimeter wave (mmW) radio frequency spectrum bands, the subcarrier spacing for the synchronization signal is 120 kilohertz or 240 kilohertz.

32. The apparatus of claim 27, wherein the instructions are further executable by the processor to cause the apparatus to:

identify a plurality of subcarrier spacings of synchronization signals transmitted by a plurality of cells that neighbor the base station; and store the plurality of subcarrier spacings, wherein identifying the subcarrier spacing of the neighboring cell is based at least in part on storing the plurality of subcarrier spacings.

33. The apparatus of claim 27, wherein the instructions are further executable by the processor to cause the apparatus to:

receive a measurement report from the UE based at least in part on transmitting the indication.

34. The apparatus of claim 27, wherein the indication is part of a measurement configuration message transmitted by the base station to the UE.

35. The apparatus of claim 27, wherein the indication is a one-bit field.

36. The apparatus of claim 27, wherein the indication is part of a radio resource control (RRC) message.

37. An apparatus for wireless communication at a user equipment (UE), comprising:

a processor, memory in electronic communication with the processor; and instructions stored in the memory and executable by the processor to cause the apparatus to:

receive an indication, from a base station, indicating one or more radio frequency spectrum band resources to be monitored by the UE during an intra-frequency and inter-frequency search and measurement procedure;

identify the one or more radio frequency spectrum band resources of a plurality of radio frequency spectrum band resources are to be monitored by the UE during the intra-frequency and inter-frequency search and measurement procedure based on the received indication;

identify a plurality of subcarrier spacings of a synchronization signal transmitted by a neighboring cell, the plurality of subcarrier spacings being associated with the one or more radio frequency spectrum band resources identified to be monitored; and perform the search and measurement procedure by monitoring the synchronization signal of the neighboring cell using one or more of the plurality of subcarrier spacings.

38. The apparatus of claim 37, wherein the instructions are further executable by the processor to cause the apparatus to:

the instructions to determine a search order for the plurality of subcarrier spacings, wherein monitoring the synchronization signal are executable by the processor to cause the apparatus to monitor the synchronization signal using a first subcarrier spacing in the search order and monitoring the synchronization signal using a second subcarrier spacing in the search order after using the first subcarrier spacing.

39. The apparatus of claim 38, wherein the indication from a base station further indicates subcarrier spacing associated with a specific synchronization signal, wherein determining the search order is based at least in part on receiving the indication.

40. The apparatus of claim 38, wherein the instructions are further executable by the processor to cause the apparatus to:

identify the first subcarrier spacing from the plurality of subcarrier spacings using a database of subcarrier spacings stored by the UE, wherein determining the search order is based at least in part on using the database of subcarrier spacings stored by the UE.

41. The apparatus of claim 38, wherein the instructions are further executable by the processor to cause the apparatus to:

identify the first subcarrier spacing from the plurality of subcarrier spacings based on a preconfigured order, wherein determining the search order is based at least in part on using the preconfigured order.

42. The apparatus of claim 37, wherein the instructions are further executable by the processor to cause the apparatus to:

transmit a measurement report to a base station based at least in part on monitoring the synchronization signal using the one or more of the plurality of subcarrier spacings.

43. The apparatus of claim 37, wherein the instructions are further executable by the processor to cause the apparatus to:

identify a subcarrier spacing of a specific synchronization signal transmitted by a cell connected to the UE; and store the subcarrier spacing of the cell, wherein identifying the plurality of subcarrier spacings of the neighboring cell is based at least in part on storing the subcarrier spacing.

44. The apparatus of claim 37, wherein the plurality of subcarrier spacings includes a set of two possible subcarrier spacings for a given set of radio frequency spectrum band resources.

45. The apparatus of claim 44, wherein in sub-six radio frequency spectrum bands, the plurality of subcarrier spacings for the synchronization signal is 15 kilohertz or 30 kilohertz.

46. The apparatus of claim 44, wherein in millimeter wave (mmW) radio frequency spectrum bands, the plurality of subcarrier spacings for the synchronization signal is 120 kilohertz or 240 kilohertz.

47. The apparatus of claim 37, wherein the instructions are further executable by the processor to cause the apparatus to:
monitor the one or more of the plurality of subcarrier spacings based at least in part on failing to receive an indication from a base station about a subcarrier spacing associated with a specific synchronization signal.

48. An apparatus for wireless communication at a user equipment (UE), comprising:
a processor,
memory in electronic communication with the processor; and
instructions stored in the memory and executable by the processor to cause the apparatus to:
initiate an intra-frequency and inter-frequency search and measurement procedure;
receive an indication, from a base station, indicating one or more radio frequency spectrum band resources to be monitored by the UE during the intra-frequency and inter-frequency search and measurement procedure;
identify the one or more radio frequency spectrum band resources of a plurality of radio frequency spectrum band resources are to be monitored during the intra-frequency and inter-frequency search and measurement procedure based on the received indication;
identify a subcarrier spacing of a synchronization signal transmitted by a neighboring cell from a plurality of possible subcarrier spacings of the synchronization signal based at least in part on identifying which one or more radio frequency spectrum band resources are to be monitored, the plurality of subcarrier spacings being associated with which one or more radio frequency spectrum band resources are to be monitored; and
monitor the synchronization signal of the neighboring cell using the identified subcarrier spacing.

49. The apparatus of claim 48, wherein the instructions are further executable by the processor to cause the apparatus to:
receive an indication of the subcarrier spacing of the synchronization signal from a base station, wherein identifying the subcarrier spacing is based at least in part on receiving the indication.

50. The apparatus of claim 48, wherein the instructions are further executable by the processor to cause the apparatus to:
identify the neighboring cell to be monitored during the intra-frequency and inter-frequency search and measurement procedure, wherein identifying the subcarrier spacing is based at least in part on identifying the neighboring cell.

51. The apparatus of claim 48, wherein the instructions are further executable by the processor to cause the apparatus to:
search a database of subcarrier spacings stored on the UE, wherein identifying the subcarrier spacing is based at least in part on identifying the neighboring cell.

* * * * *